(12) United States Patent
Swank

(10) Patent No.: US 11,796,986 B2
(45) Date of Patent: Oct. 24, 2023

(54) SYSTEM AND METHOD FOR SMART SYSTEM MONITORING AND CONTROL

(71) Applicant: Global Innovation Platform, LLC., Paris, TX (US)

(72) Inventor: David W. Swank, Stillwater, OK (US)

(73) Assignee: GLOBAL INNOVATION PLATFORM, LLC., Paris, TX (US)

( * ) Notice: Subject to any disclaimer, the term of this patent is extended or adjusted under 35 U.S.C. 154(b) by 330 days.

(21) Appl. No.: 17/178,722

(22) Filed: Feb. 18, 2021

(65) Prior Publication Data
US 2022/0260973 A1  Aug. 18, 2022

(51) Int. Cl.
  *G05B 19/418* (2006.01)
  *G05B 13/04* (2006.01)

(52) U.S. Cl.
  CPC ....... *G05B 19/4184* (2013.01); *G05B 13/042* (2013.01); *G05B 13/048* (2013.01); *G05B 2219/31336* (2013.01); *G05B 2219/40458* (2013.01)

(58) Field of Classification Search
  CPC .... G05B 13/04; G05B 13/042; G05B 13/048; G05B 23/0294; G05B 15/02; G05B 19/4184; G05B 2219/2642; G05B 2219/31336; G05B 2219/40458; F24F 11/46; G06F 1/3203; G06F 1/3234; G06F 1/3206; H02J 3/003; H02J 13/00004; H02J 2203/20
  See application file for complete search history.

(56) References Cited

U.S. PATENT DOCUMENTS

| | | | |
|---|---|---|---|
| 2013/0179373 A1 | 7/2013 | Mutchnik et al. | |
| 2015/0178865 A1* | 6/2015 | Anderson | G06Q 50/163 |
| | | | 705/7.25 |
| 2018/0158314 A1 | 6/2018 | Larsson | |
| 2018/0252427 A1* | 9/2018 | Hieke | F24F 11/62 |

(Continued)

OTHER PUBLICATIONS

Burger, S.P. et al., "Business Models for Distrubuted Energy Resources: A Review and Empirical Analysis," An MIT Energy Initiative Working Paper, Apr. 2016, 40 pages.

(Continued)

*Primary Examiner* — M. N. Von Buhr
(74) *Attorney, Agent, or Firm* — SLATER MATSIL, LLP

(57) ABSTRACT

A system includes a first facility element having a sensor and configured to generate recent performance data associated with a system of a facility, and a monitoring and control element in communication with the first facility element, where the monitoring and control element is configured to identify one or more analogous facility elements analogous to the first facility element, receive the recent performance data for the first facility element, generate projected performance data for the facility element according to historical performance data associated with the facility element and the one or more analogous facility elements, compare the projected performance data to a performance threshold, and override a setting or operating parameter of the first facility element according to a relationship of the projected performance data to the performance threshold and by sending one or more operational adjustment commands to at least one second facility element.

20 Claims, 12 Drawing Sheets

(56) References Cited

U.S. PATENT DOCUMENTS

| | | |
|---|---|---|
| 2019/0033353 A1 | 1/2019 | Quinn et al. |
| 2020/0090289 A1* | 3/2020 | Elbsat et al. |
| 2021/0003308 A1* | 1/2021 | Venne ..................... F24F 11/64 |
| 2021/0302043 A1* | 9/2021 | Dempsey ................ F24F 11/64 |

OTHER PUBLICATIONS

"Energy Cloud 4.0 Capturing Business Value Through Disruptive Energy Platforms," Navigant, White Paper, Published 2018, 48 pages.

Smidt, H. et al., "Smart Application Development for IoT Asset Management Using Graph Database Modeling and High-Availability Web Services," Proceedings of the 51st Hawaii International Conference on System Sciences, 2018, 39 pages.

Widergren, S., "Interoperability Strategic Vision," Whitepaper, Grid Modernization Laboratory Consortium Report, Pacific Northwest National Laboratory, Apr. 2017, Accessed Feb. 2018, 22 pages.

Zurborg, A., "Unlocking Customer Value: The Virtual Power Plant," worldPower, 2010, 7 pages.

* cited by examiner

SYSTEM AND METHOD FOR SMART SYSTEM MONITORING AND CONTROL

TECHNICAL FIELD

The present invention relates generally to systems and methods for smart system management, and, in particular embodiments, to systems and methods for monitoring power draw of systems in a facility, and controlling power usage of the systems within the facility in relation to a predefined power usage level.

BACKGROUND

The provision of ample power to facilities, including residential, retail, commercial, and industrial customers, depends not only on the ability to generate sufficient power, but to economically deliver the power to the relevant site. Power providers attempt to size power generation facilities and the associated transmission lines as economically as possible by anticipating the power needs of customers served by a particular power generation station, transmission system, or the like. However, the power systems must be sized to handle even instantaneous increases in power consumption by one or more customers at any time. Sizing the power system provides for adequate power generation facilities, transformers, transmission lines, and other system elements to handle a designated power load. However, the larger, or greater, power generation or handling capacity for each element of a power system, the greater the cost. Thus, power systems are generally sized to handle a predetermined load. In order to encourage customers to avoid peak or transient spikes in their individual power usage, some power providers have implemented demand rates as financial incentives for customers to level out or smooth power demand. The demand rates for power usage may, for example, be set in five month blocks to account for varying weather and the overall effect of, for example, jot weather ion air conditioning system power use, or cold weather on heating system gas use. Thus, while power providers' price power based on usage, the power providers may implement an additional demand rate or demand charge for any power draw that exceeds a predefined level. Similarly, natural gas providers may have arrangements with large or commercial gas customers to reduce or stop gas use, and switch to an alternative fuel source, such as fuel oil during times of high demand, such as extreme cold weather. Switching back to fueling a boiler or heating system to use natural gas during a gas use reduction period results in large demand charges.

SUMMARY

An embodiment system includes a first facility element having a sensor associated therewith and configured to generate recent performance data associated with a system of a facility, and a monitoring and control element in signal communication with the first facility element, where the monitoring and control element is configured to identify one or more analogous facility elements that are analogous to the first facility element, receive the recent performance data for the first facility element, generate projected performance data for the facility element according to historical performance data associated with the facility element and the one or more analogous facility elements, compare the projected performance data to a performance threshold, and override at least one of a setting or operating parameter of the first facility element according to a relationship of the projected performance data to the performance threshold and by sending one or more operational adjustment commands to at least one second facility element.

An embodiment apparatus includes one or more processors, and a non-transitory computer-readable storage medium storing a program to be executed by the one or more processors for management of a smart facility, the program including instructions for receiving recent performance data for a facility element, generating projected performance data for the facility element according to historical performance data associated with the facility element, determining whether operational adjustment of the facility element is needed according to the projected performance data, determining, in response to determining that the operational adjustment of the facility element is needed, one or more operational adjustment commands, and sending, to a system controlling operation of the facility element, the one or more operational adjustment commands.

An embodiment method includes receiving recent performance data for a facility element, generating projected performance data for the facility element according to historical performance data associated with the facility element, determining whether operational adjustment of the facility element is needed according to the projected performance data, determining, in response to determining that the operational adjustment of the facility element is needed, one or more operational adjustment commands, and sending, to a system controlling operation of the facility element, the one or more operational adjustment commands.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the presented disclosure provide for power efficient design coupled with automated management, including monitoring and control, of smart system utility usage that reduces both average utility use and transient spikes in utility demand that avoids demand rate charges. More specifically, the power demand for facilities, and even for individual pieces of equipment or equipment subsystems, may be monitored for actual power use, and future power use forecast in order to provide a basis for controlling power demand. Power use forecasting may be associated with actual people in a facility, historical power usage of the building, historical power usage for related or associated facilities, system-specific external factors, or the like.

Figure 1:
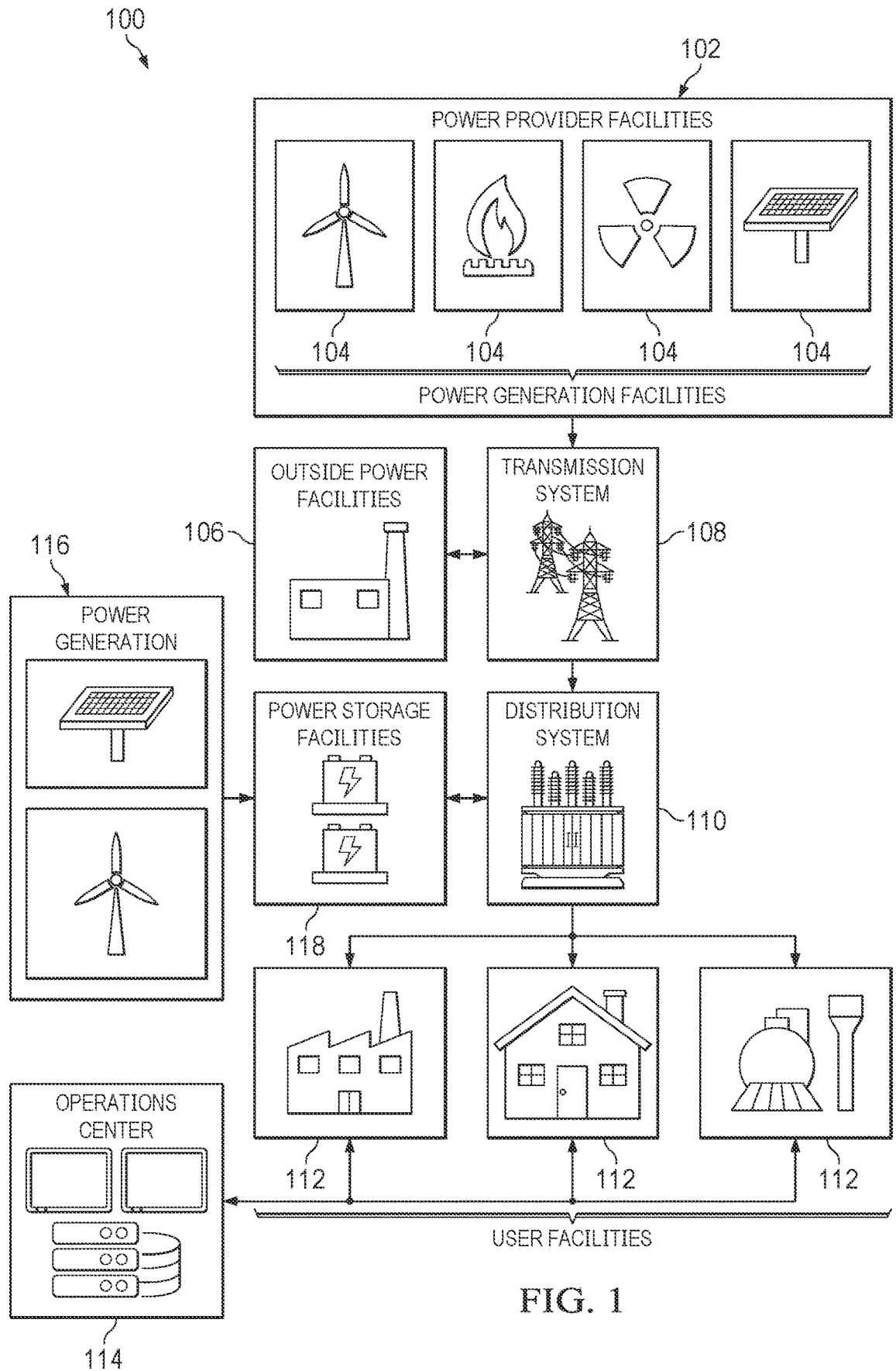
FIG. 1 is a diagram illustrating a power grid system according to some embodiments.

FIG. 1 is a diagram illustrating a power grid system 100 according to some embodiments. A power grid system 100 may include power provider facilities 102. The power provider facilities 102 may include one or more power generation facilities 104 such as wind, solar, combustion, thermal, hydroelectric, nuclear or other power generation facilities. The power generated by the power generation facilities 104 may be carried by a transmission system 108, which may also receive power from outside power facilities 106, or provide power to outside power facilities 106. The transmission system 108 may provide power to one or more distribution systems 110, which may include local grids, power substations, or the like. The power distribution systems no provide power to one or more facilities 112 for end users or customers. The facilities 112 may be commercial facilities, industrial facilities, residential facilities, or the like. The commercial facilities may be restaurants, theaters, retail stores, office space, and the like. The industrial facilities may be warehouses or distribution centers, heavy manufacturing facilities, refineries, chemical production facilities, rail yards, or the like.

One or more power storage facilities 118 may be connected to the distribution system no for storing power from the distribution system 110, or from one or more power generation systems 116. In some embodiments, the power storage facilities 118 may be electrical storage systems such as battery or capacitor banks, mechanical systems such as pumped storage hydropower systems, thermal or chemical process energy storage systems such as molten salt storage systems, hydrogen generation storage systems, or the like. The power storage facilities 118 may act as a buffer for facilities 112 when energy demand is high, or may allow the sale of power back to a regional or local power provider though the distribution system 110 or transmission system 108. Thus, the power generation systems 116 may be used to charge the power storage facilities 118 when power costs are low or provide power to user facilities 112 when power costs are high. However, the economics of the system and facility load characteristics may dictate a demand control strategy such as reducing, shifting or modulating power demands at the facilities 112, and selling power from the power generation systems 116 or power storage facilities 118 is more cost effective than using the stored or generated power at the user facilities 112.

A monitoring and control element, such as a digital operations center (DOC) 114, may be connected to one or more facilities 112 to provide monitoring, control, optimization and management for systems, such as power systems, for each facility 112. The DOC 114 may attempt to optimize asset performance, while ensuring a quality of asset value and verify usage and charges. For example, the DOC 114 may control an HVAC system to ensure that the HVAC system is operating optimally for the operation conditions, such as temperature, occupancy, projected use, and the like, while providing sufficient air circulation and fresh air injection so that the air quality in a facility is at an acceptable level. Additionally, the DOC 114 may monitor the actual used power and compare that to the billed power usage to ensure that the facility is not overcharged, and to verity or check energy efficiency.

Each facility 112, or each class of facility, may have a different power usage profile. The power usage profile may include a profile of power used throughout the day, power usage in relation to external factors, such as weather, power usage related to time of year or the like. For example, a retail establishment that opens at moo a.m. may use relatively little power in the morning, but may then use a fairly constant level of power during business hours. In contrast, a restaurant may use power for cooking and preparing for business prior to opening, with the power draw remaining flat from before opening through, for example, a lunch rush, after which the power usage may drop, and then may increase as evening arrives and a busy dinner rush occurs.

On the other hand, manufacturing facilities may have large variances in power usage due to the nature of the equipment used in heavy manufacturing. For example, electric arc furnaces use an enormous amount of power for fairly long periods of time, while hydraulic presses, overhead cranes, and the like use less power in more intermittent fashion.

However, most facilities 112 will have some sort of environmental control apparatus for regulating or controlling the interior environment of a facility. In some instances, the environmental control apparatus includes a cooling apparatus such as an air conditioner, chiller, or the like. In some instances, the environmental control apparatus includes a heating apparatus such as a boiler system furnace, heat exchanger, or the like, or may include a combination heating/cooling apparatus such as a heating, ventilation and air conditioning (HVAC) apparatus, or the like.

The DOC 114 may constantly monitor power usage at each facility 112, and may control one or more electrical subsystems at the facility 112 based on the current power demand, as well as a predicted or projected power demand. The control of the electrical subsystems at each facility 112 may be performed to try to avoid power usage that instantaneously, or over a predefined time period, exceeds a predetermined demand rate level. The DOC 114 may receive data signals indicating the power use at a subsystem or facility level and may send one or more commands or signals to control power usage at a facility 112 or one of more facility subsystems. Additionally, the DOC 114 may monitor the load on one or more electrical panels or meters, for example, at a step-down transformer, to track actual power use for billing verification.

Since most facilities 112 include an environmental control apparatus, and the outputs, or controlled temperature, provided by the environmental control apparatus have some allowable variance, the DOC 114 may control the operation of the environmental control apparatus to manage the overall power consumption of a facility 112. In some embodiments, the DOC 114 may control the environmental control apparatus alone, or in combination with another facility element such as lights, power outlets, water heaters, security systems, installed equipment, or the like, to manage the overall power usage for a facility 112.

In some embodiments, the DOC 114 provides a real-time view to an operator indicating the power usage and status of each facility, subsystem, or other logical system grouping. The DOC 114 may also provide an interactive user interface for manually controlling one or many facility subsystems, or the like. Thus, the DOC 114 may provide an automated control method for controlling power-drawing subsystems of one or more facilities 112, and may also provide an interface allowing an operator to manually control any of the subsystems, or override automated commands by modifying, changing, or cancel existing automated commands, or by creating new commands. Additionally, the DOC 114, or an operator working through the DOC 114, may automatically or manually adjust operation of the subsystems at the facilities 112 according to signals from power distributors, such as pricing or demand signals, and may also adjust power flow from the power storage facilities 118 or power generation system 116 to provide power to the facilities 112 in place of purchased power from the distribution system 110 or transmission system 108. Similarly, the DOC 114 may control the flow of power from the power storage facilities 118 or power generation systems 116 back to the distribution system 110 or transmission system 108.

Figure 2A:
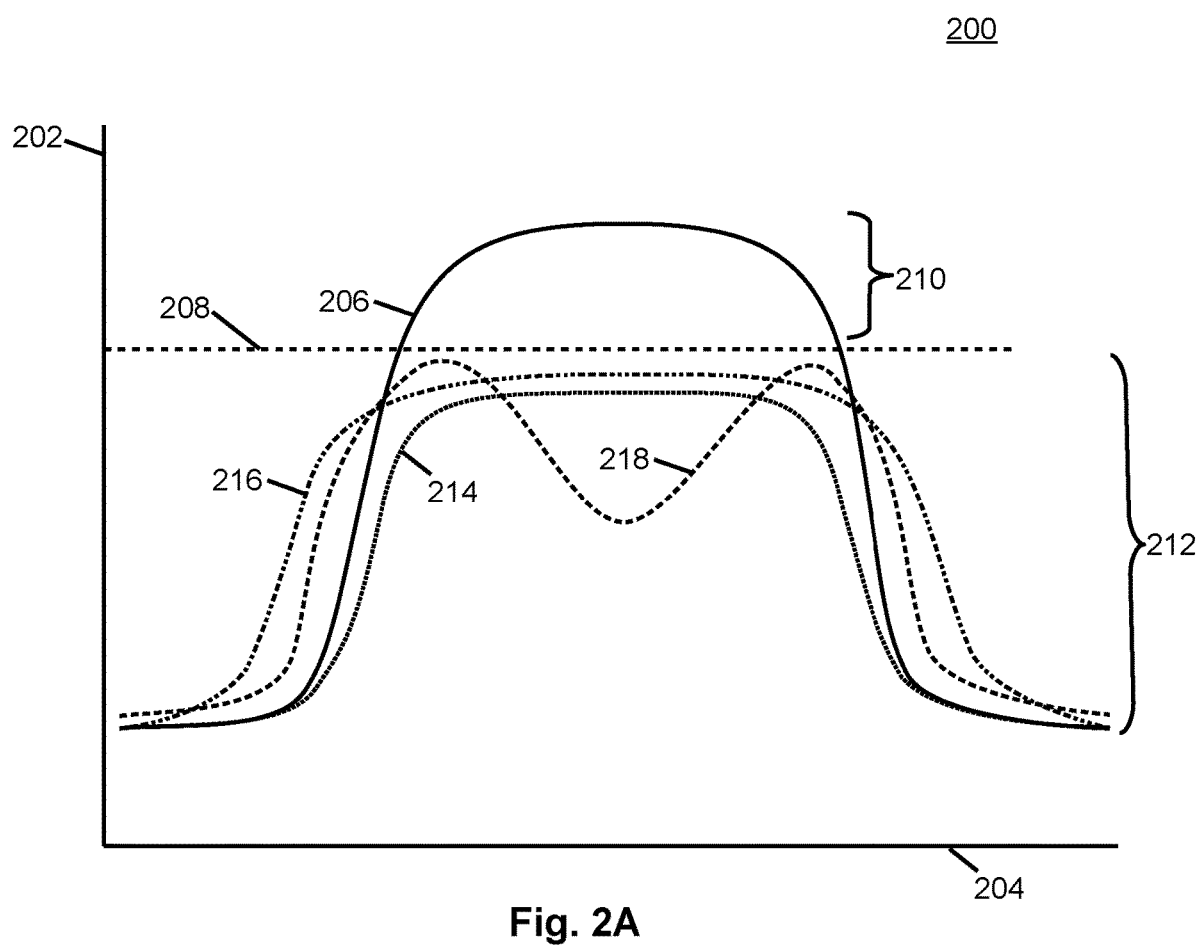
FIG. 2A is a diagram illustrating a typical power demand curve and controlled power demand curves according to some embodiments.

FIG. 2A is a diagram 200 illustrating a typical power demand curve 206 and a controlled power demand curves 214, 216, and 218 according to some embodiments. In the diagram 200, the horizontal axis 204 represents time, and the vertical axis 202 represents total power draw at, for example, a facility. The typical power demand curve 206 may be associated with a power profile for a facility and may include an actual power demand, a predicted power demand, or a combination of actual and predicted power demand. The typical power demand curve 206 may include the power demand over time for a particular facility, and where the power demand exceeds a threshold 208 such as a demand rate level, a facility may have demand charges applied in addition to charges for the actual power use. The demand rate level type threshold 208 is frequently set when the facility or power system is designed or constructed, with the power system sized to handle the anticipated demand, so that the amount of power that is produced or purchased is maintained at a predictable level. For example, a 20 megawatt (MW) power generation facility may provide power to multiple facilities, and when all facilities have a power demand that exceeds the 20 MW power generation capacity of the power generation facility, the power system operator may need to purchase power on a spot market at high prices or even implement brownouts or other power cutoffs to protect the integrity of the power system. Similarly, excess power draw on a particular part of the transmission lines or power distribution system may damage the contents of the relative system. The demand rate charge encourages efficient use of power, or at the very least, encourages avoidance of transient demand peaks and a more constant, predicable power draw across large scale power systems.

However, the threshold 208 may also be tied to pricing or rate structures set by a connected utility, or market signals from a regional transmission organization (RTO) or generation and transmission (G&T) entity. This pricing, may, for example, be adjusted dynamically based on regional demand, market spot pricing, or the like, and the pricing data may be provided through a standardized messaging system such as Open ADR, or the like. The threshold 208 may, for example, be set dynamically, so that demand is reduced when spot prices are high, and the excess demand, or stored energy, may be sold back into the distribution system. Setting the threshold 208 according to such pricing signals may also include setting the threshold so that an acceptable level of facility usability or user satisfaction is achieved. Thus, the threshold may be set so that power demand at a facility is reduced, but not reduced below a point where critical equipment becomes unusable, or climate control makes a facility untenable.

In some embodiments, a monitoring and control element such as a DOC or the like may control one or more systems, subsystems, or the like for a particular facility to control the power demand and or a facility. The DOC may use one or more different approaches to keeping power demand for a facility below a threshold 208. For example, the DOC may use a reduced power demand or demand savings process, a power use modulation strategy, a demand shifting strategy, one or more other power demand control strategies, or a combination of strategies. A reduced power demand strategy may cause a facility to follow a controlled reduced power demand curve 214, with the power demand at any particular time being reduced from the typical power demand curve by simply reducing the power usage at a facility at any particular time. A power demand shifting strategy may cause a facility to follow a controlled demand shifting curve 216, where the DOC controls facility elements to operate at times where the threshold is higher, or where a predicted overall power demand allows operation of a facility elements while keeping the overall facility demand below the threshold. A power use modulation strategy may cause a facility to follow a controlled modulated demand curve 218, where different facility elements are timed to run at different times to reduce the instantaneous power use at any particular time to remain below the threshold.

In some embodiments, the DOC may control facility elements to follow the controlled reduced power demand curve 214, and keep the power demand below the threshold 208. The DOC may analyze power usage during a usable power demand curve portion 212 to avoid the power demand following the typical power demand curve 206 into an excess power demand curve portion 210. In some embodiments, the demand reduction may include adjusting operation of elements of a climate control unit or other facility feature, turning off or dimming lighting, shutting down equipment, or the like. For example, the DOC may control the heating element of a water heater to operate intermittently or at a reduced temperature to reduce overall power usage, or may instruct a blower or compressor of an HVAC system to turn off or run at a reduced capacity.

In some embodiments, the DOC may control facility elements to follow the controlled demand shifting curve 216, and keep the power demand below the threshold 208. The DOC may analyze power usage or project anticipated power usage to determine whether projected power demand will exceed the threshold 208, and may shift operation of one or more facility features to run at a time that avoids the total power usage exceeding the threshold. For example, the DOC may control a pool pump to run earlier or later than normally scheduled to ensure that the pool pump does not cause the facility power usage to exceed the threshold. Similarly, an HVAC system scheduled to lower a facility temperature prior to opening may run earlier than scheduled to ensure that the temperature is at a desired level at the desired time, but avoid the HVAC system running when other systems are powering up at the beginning of a business day, ensuring that the power usage at any particular time does not exceed the threshold 208.

In some embodiments, the DOC may control facility elements to follow the controlled modulated demand curve 218, and keep the power demand below the threshold 208. The DOC may analyze power usage or project anticipated power usage to determine whether projected power demand will exceed the threshold 208, and time operations of one or more facility elements to ensure that the facility elements run in a pattern that avoids, for example, multiple elements running at the same time, which may cause the total facility power usage to exceed the threshold 208. For example, the DOC may control multiple HVAC units to run at alternating times so that all of the HVAC units to not turn on at the same time. Thus, a DOC monitoring a facility with, for example, 6 HVAC units may control 3 of the HVAC units to turn on for a period, and then turn off those 3 HVAC units, and then run the other 3 HVAC units. Thus, only 3 HVAC units are running at any one time, reducing the instantaneous power demand, and avoiding the facility power usage at any particular time from exceeding the threshold 208. In some embodiments, the DOC analyzes the immediately prior and current power usage for a facility, and attempts to forecast the power usage for the facility based on weather, facility type, time of year, historical usage, or the like. In situations where immediately previous usage, current usage or historical usage is not available for a desired time period, the immediately previous usage, current usage or historical usage may be generated using relevant usage data for related, similar or analogous facilities. For example, a relatively new building may not have historical usage for a particular time period, day, week or month, or for a relevant environment, such as a projected external temperature range, and the DOC may determining an analogous facility, or an analogous facility element, and use the historical performance data for the analogous facility or facility element as the basis for projecting the power usage for the target facility or target facility element.

Figure 2B:
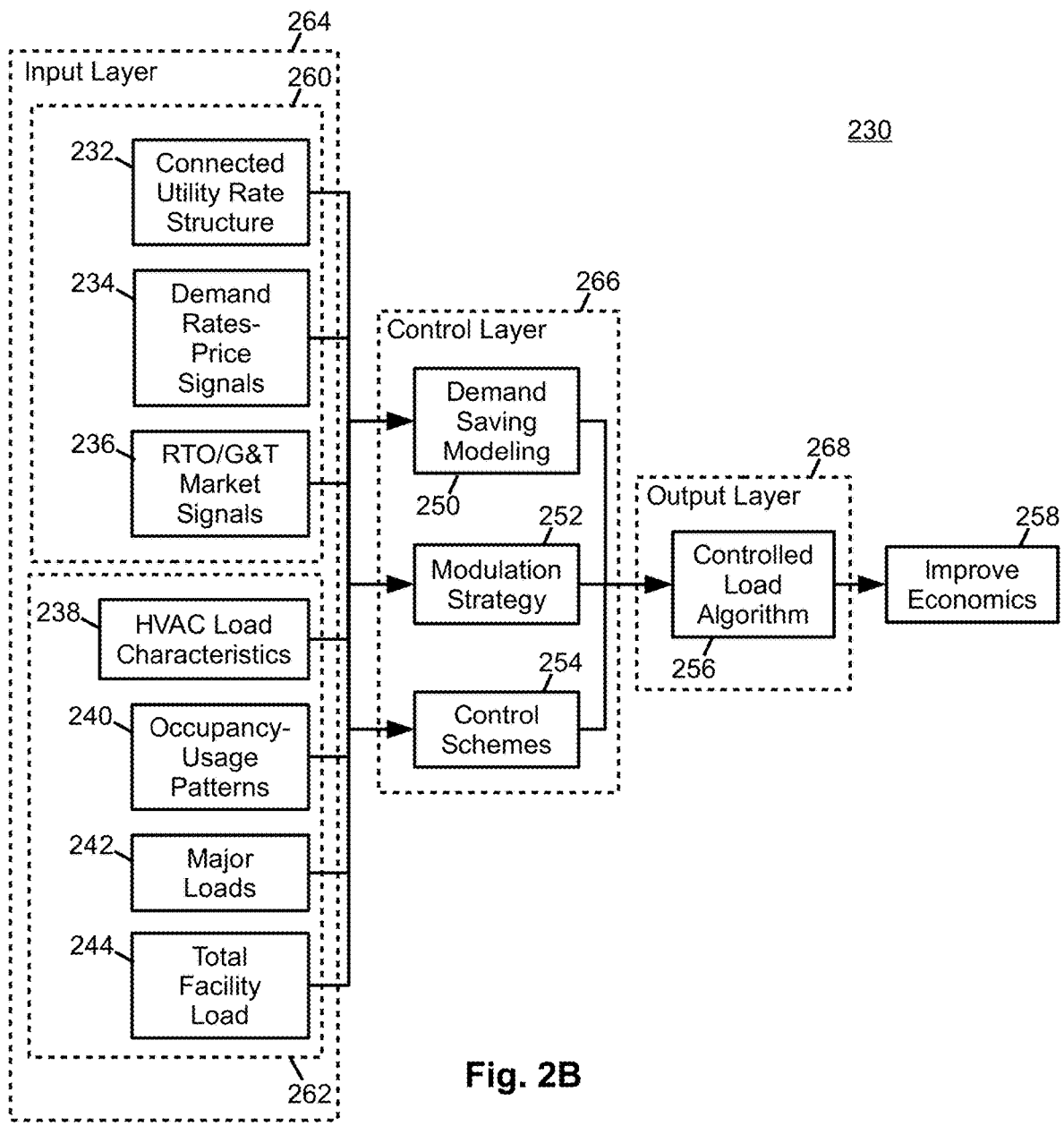
FIG. 2B is a diagram illustrating a flow for handling control of facility elements according to some embodiments.

FIG. 2B is a diagram 230 illustrating a flow for handling control of facility elements according to some embodiments. A system may use one or more data generating elements 260, and one or more relational data elements 262 to generate and associate data and for determining how elements of a facility may be managed.

In some embodiments, a graph database may be used to graph relationships between data elements or nodes. The graph enables nodes to be uniquely structured and related to reveal patterns and insights otherwise difficult to see in a traditional relational database. The graph may be utilized to create optimal load shifting, load shaving and load modulation strategies from a highly connected network of nodes that substantially enhance the modeling granularity required. The global graph may also provide energy benchmarking from building to building, asset to asset, and by regional areas based on energy markets. This enables the creation of digital twins within the network.

An input layer 264 may include the data generating elements 260 and the relational data elements 262. The data generating elements 260 may be elements that generate internet of things (IoT) data, such as a connected utility rate structure 232, demand rate and price signals 234, RTO or G&T signals 236, or the like. The relational data elements 262 may include data such as HVAC or other equipment load characteristics 238, occupancy or usage patterns 240, data related to major loads 242, and total facility load 244.

The input layer 264 creates a dynamic environment where assets, infrastructure, people, and data can be modeled through a global graph architecture. The input layer 264 of the builds context to create the opportunity for machine learning and predictive control of facility features to control utility demand. For example, the input layer 264 may gather significant data on the HVAC run cycles under varying conditions to forecast how the asset could be used for virtual power verse energy consumption. Using peripheral, related, and real-time IoT data provides increased insights into the relationship between rate structures, utility demand periods such as time of use (TOU), load characteristics of the building, weather patterns, occupancy, etc. The graph permits identification of relationships between connected facility features.

A control layer 266 may use data from the input layer 264 to model power usage and determine adjustments to facility elements. The relational nodes permits forecasting of the potential savings, modulation strategies and what alternative control schemes are afforded based on the contextual relationship of all input nodes. The increased data from all the nodes over time allows optimization of the control scheme options and output using machine learning and improved forecasting. For example, the input layer 264 may permit analysis of a peak-to-average ratio (PAR) within the total building load and PAR of each of the major loads (HVAC, water heating, etc.) A digital operations center (DOC) enables data scientists to see and manipulate large data sets to better understand how these ratios create building energy flexibility and steer the machine learning and forecasting accordingly. This flexibility can then be aligned with market conditions from the distribution level to an RTO.

The output layer 268 may include a controlled load algorithm 268 that applies the modelled data from the control layer 266 to generate commands that control operation of facility features to adjust the end-user's consumption patterns and therefore reduce demand cost. In some embodiments, the load shape of the facilities or specific load will be used to flexibly determine the strategy for applying building demand management such as demand or load shedding or reduction, demand shifting, demand modulation, or the like. In some embodiments, the required information for determining the building demand management may be sent to DOC for centralized management, or distributed to edge computing facilities for autonomous load management. The building demand management reduces the amount of power used, and may also shift the load used by a building to advantageously leverage data regarding shifting energy costs, network power demands, facility power requirements and storage/generation capabilities, or network power purchasing parameters to improve economics 258 of facility utility use.

Figure 2C:
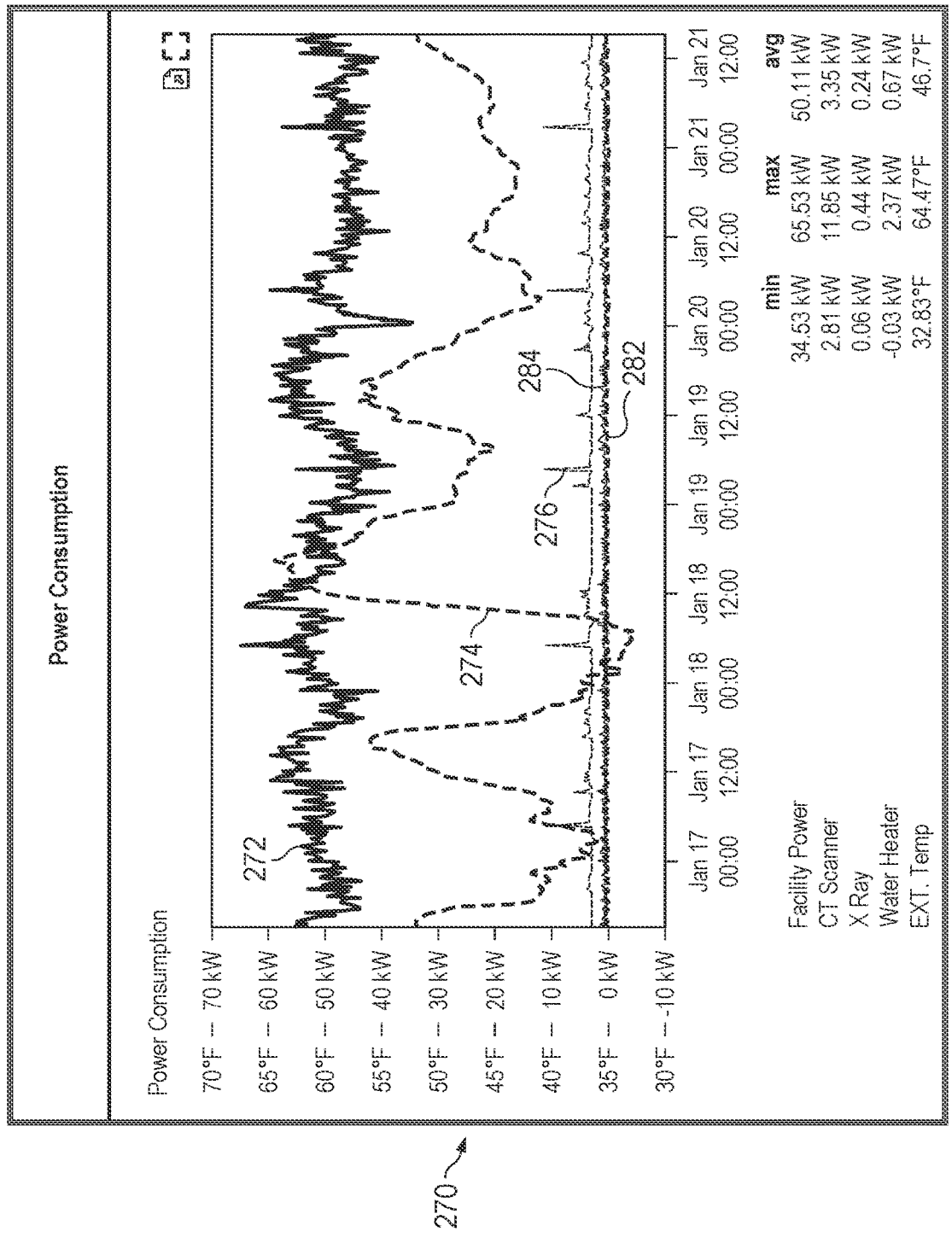
FIG. 2C is a diagram illustrating a visualization of a power consumption chart according to some embodiments.

FIG. 2C is a diagram illustrating a visualization of a power consumption chart 270 according to some embodiments. The power consumption chart 270 may be used to visualize data received or derived from the input layer. For example, the overall facility power 272 may be shown with respect to, for example, an eternal temperature 274. Additionally the power demand of individual features may be shown with respect to the overall facility power 272 or other data. For example, the chart 270 may show the power demand of equipment such as an X-ray machine power demand 284, water heater power demand 282, or CT scanner power demand 276. Notably the CT scanner power demand 276 illustrates that the CT scanner is a high PAR device in relation to the X-ray machine or water heater. In this instance, the CT scanner may draw considerably more power when in use than when idle, and may be a good candidate for demand shifting or demand modulation. For example, scheduling of the CT scanner may be used as part of the demand modulation control so that power to an HVAC system or the like is reduced or cut when the CT scanner is being used so that the instantaneous power draw of the facility is maintained below a predetermined threshold. Visualizations may also be provided to illustrate real-time data collected from a facility, to track the application of facility element controls, allow manual control of facility elements or permit operators to verify automated systems. For example, floor plans for individual buildings may be provided in a DOC monitoring setup, and individual facilities, multiple facilities, or aggregated facilities may be visually monitored.

Figure 3:
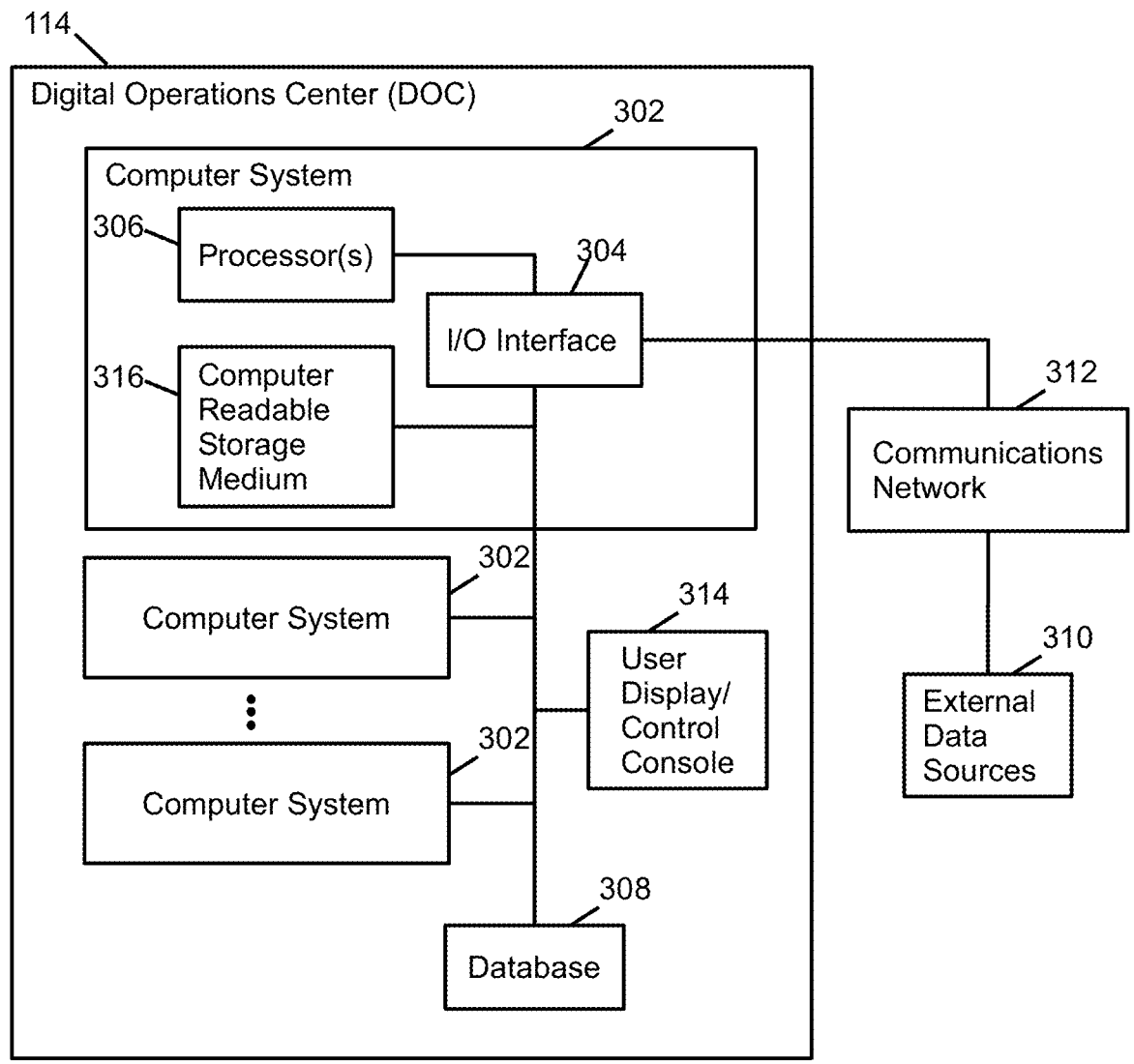
FIG. 3 illustrates a digital operations center (DOC) for implementing the mode decomposition process according to some embodiments.

FIG. 3 illustrates a digital operations center 114 (DOC) for implementing the mode decomposition process according to some embodiments. The DOC 114 may include a database 308 and one or more computer systems 302 such as servers, or the like, that may be configured for performing one or more functions with regard to monitoring, control, optimization and management for connected systems. Further, any processing and analysis can be partly or fully performed by the computer system 302. Each computer system 302 can include an input/output (I/O) interface 304. Alternative embodiments can combine or distribute the I/O interface 304, and the database 308, as desired. Each computer system 302 may have one or more processors 306 or central processing units (CPUs) and a non-transitory computer readable storage medium 316 or non-volatile memory that stores a program or software instructions for instructing the processors 306 to perform at least some of the tasks described herein. The DOC 114 may have two or more computer systems 302 that are in communication via a communications network 312, where one or more of the computer systems 302 include a processor 306 and non-transitory computer readable storage medium 316, and one or more of the computer systems 302 have a non-transitory computer readable storage medium 316 storing software instructions for instructing any of the processors 306 to perform any of the tasks described herein. Thus, while some embodiments may be described in terms of a discrete machine, it should be appreciated that this description is non-limiting, and that the present description applies equally to numerous other arrangements involving one or more computer systems 302 or machines performing tasks distributed in any way among the one or more computer systems 302 or machines. It should also be appreciated that the computer systems 302 need not be dedicated to performing tasks described herein, but instead can be multi-purpose computer systems 302, for example computer workstations or shared hosting systems or cloud hosting servers, that are suitable for also performing other tasks. Additionally, the communications network 312 is not limited in scope, as the communications network 312 may be an internet protocol (IP) network, or the like, or may use a combination of network types, and may be implemented on a wireless, wired, or satellite transport, or a combination of transport technologies.

The I/O interface 304 provides a communication link between external users, systems, and data sources and components of the computer system 302. The I/O interface 304 allows one or more users to input information into, the computer systems 302 via any known input device such as a user display or control console 314. Examples can include a keyboard, mouse, touch screen, and/or any other desired input device. The I/O interface 304 can be configured for allowing one or more users to receive information output from the computer system 302 via any known output device such as the user display or control console 314. Examples can include a display monitor, a printer, cockpit display, and/or any other desired output device. The I/O interface 304 can be configured for allowing other systems to communicate with the computer system 302. For example, the I/O interface 304 can allow one or more remote computer(s) to access information, input information, and/or remotely instruct the computer system 302 to perform one or more of the tasks described herein. The I/O interface 304 can be configured for allowing communication with one or more remote data sources. For example, the I/O interface 304 can allow the computer systems 302 to access one or more external data source(s) 310 to receive sensor data or signals, access information, input information, and/or remotely instruct the computer system 302 to perform one or more of the tasks described herein. Additionally, the I/O interface 304 permits the computer system 302 to send control commands to facility subsystems, or to receive reports, sensor data, alert signals, or the like from facility systems or subsystems.

A database 308 provides persistent data storage for the computer system 302. Although the term "database" is primarily used, a memory or other suitable data storage arrangement may provide the functionality of the database 308. In alternative embodiments, the database 308 can be integral to, or separate from, the computer system 302 and can operate on one or more computers. For example, the database 308, may be provided by a cloud provider, and may be stored outside the DOC 114, and accessed by the computer systems 302 through the communications network 312 by way of the I/O interface 304. The database 308 preferably provides non-volatile data storage for any information suitable to support the operation of the DOC 114. For example, the DOC 114 may receive sensor data from one or more facilities, and process the sensor data to provide real-time monitoring and control of facility systems and subsystems. The DOC 114 may also store the sensor data for historical analysis or use as historical data in predictive processing. Thus, the DOC 114 may use the stored sensor data for a particular facility, or from another facility, to forecast conditions of a facility system or subsystem in order to control the relevant system before an undesirable condition is reached.

In some embodiments, the database 308 may be a graph database that uses graph structures for semantic queries with nodes, edges and properties to represent and store data. Edges on the graph database represent relationships between nodes, and the graph database holds the relationships between data as a priority, permitting the graph data base to directly link stored data for more efficient retrieval. In some embodiments, the graph database may be a NoSQL database that uses a language other than structured query language (SQL) to take advantage of the relationship-dependent nature of the stored data.

Figure 4:
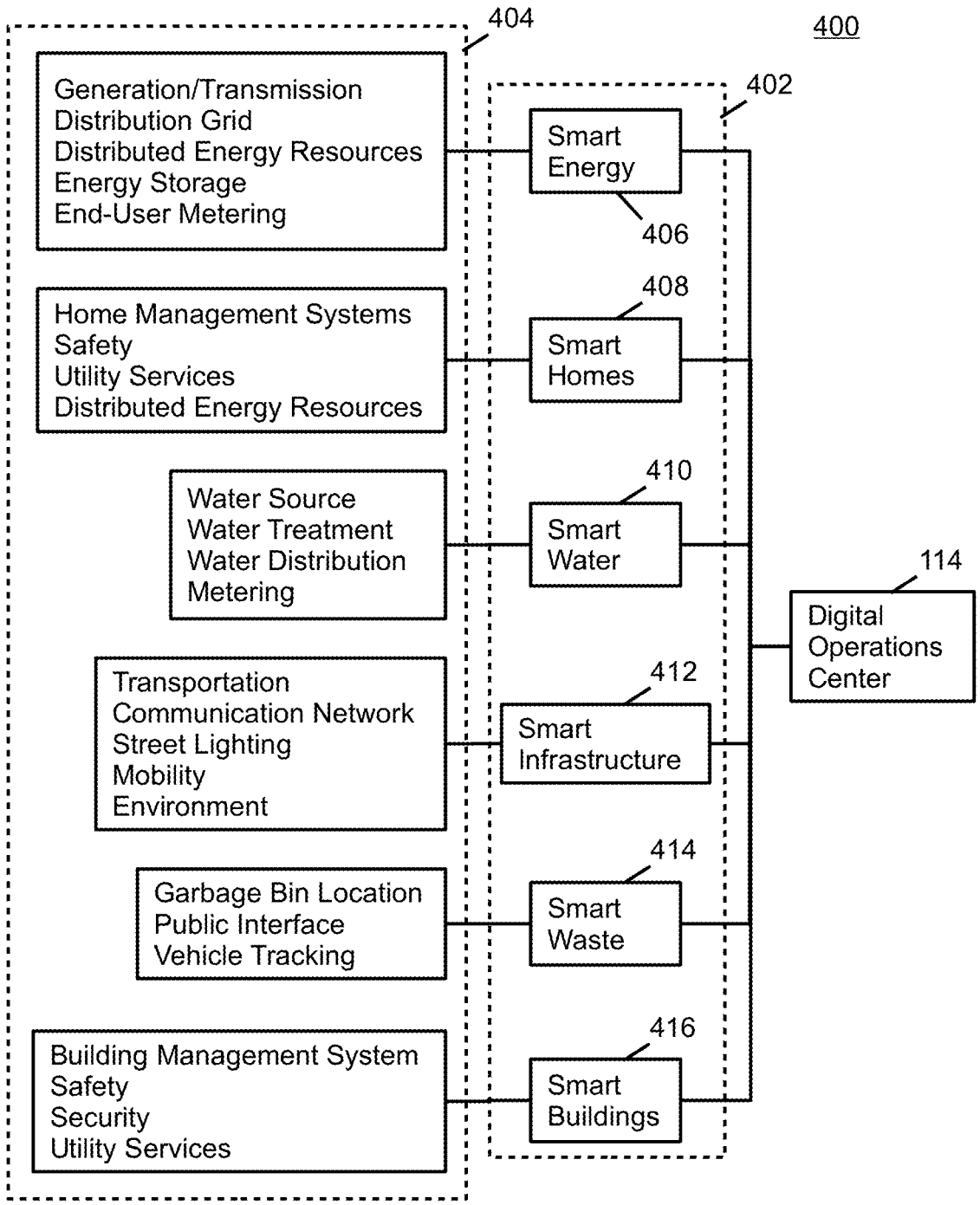
FIG. 4 illustrates a global monitoring platform system according to some embodiments.

FIG. 4 illustrates a global monitoring platform 400 system according to some embodiments. The global monitoring platform 400 may include a monitoring and control element such a DOC 114, as well as one or more different facility types 402, with each of the facility types 402 having one or more systems 404 that are monitored and/or controlled by the DOC 114. The DOC 114 may communicate with a plurality of systems or subsystems in a particular facility to monitor and/or control one or more of the subsystems. For example, the facility types 402 may, in various embodiments, include one or more of a smart energy facility 406, smart home facility 408, smart water facility 410, smart infrastructure facility 412, smart waste facility 414, or smart building facility 416. For example, a smart building facility 416 may include systems 404 such as a building management system, safety system, security system, and utility services system. Thus, the DOC 114 allows a user to monitor and control sub systems within the systems of the smart building facility 416.

Figure 5:
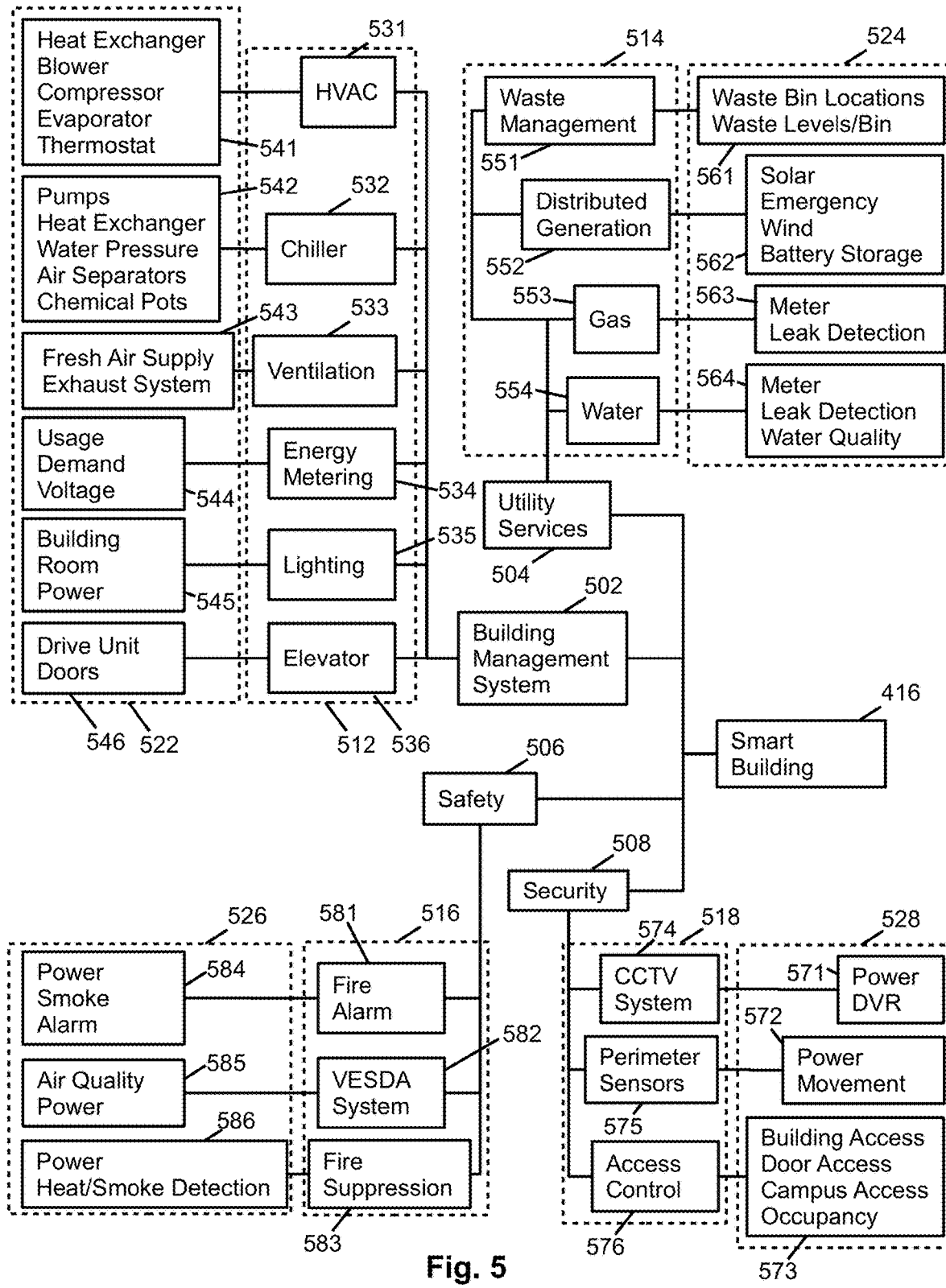
FIG. 5 illustrates a smart building facility according to some embodiments.

FIG. 5 illustrates a smart building facility 416 according to some embodiments. The smart building facility has one or more systems such as a building management system 502, a utility services system 504, a safety system 506, a security system 508, or another system. Each system 502 . . . 508 may have one or more subsystems with associated subsystem elements, allowing fine grained monitoring and control of the various systems, subsystems and even subsystem elements. The DOC may connect to the smart building facility 416 to gather data from each of the systems 502 . . . 508 and control the different subsystems or individual elements of the subsystems.

In some embodiments, the building management system 502 may have one or more building management subsystems 512 such as heating, ventilation and air conditioning (HVAC) subsystems 531, chiller subsystems 532, ventilation subsystems 533, energy metering subsystems 534, lighting subsystems 535, elevator subsystems 536, or the like. Notably, each system 502 . . . 508 in the facility may have multiple subsystems of the same type. For example, large office building may be a smart building facility 416, and the building management system 502 for the office building may have multiple HVAC subsystems 531, with, for example, a separate HVAC subsystem 531 for different areas of the building, different floor, of the like. Similarly, a building management system 502 for an office building may have multiple chiller subsystems 532, and may have a different number of chiller subsystems 532 than HVAC subsystems 531.

Each of the building management subsystems 512 may have one or more building management subsystem elements 522. For example, the HVAC subsystem 531 may have HVAC subsystem elements 541 that include one or more heat exchangers, blowers, compressors, evaporators, thermostats, or the like. A chiller subsystem 532 may have chiller subsystem elements 542 that include one or more pumps, heat exchangers, water pressure sensors or controllers, air separators, chemical pots, or the like. A ventilation subsystem 533 may have ventilation subsystem elements 543 that include one or more fresh air supply controllers or monitors, exhaust system controllers or monitors, or the like. An energy metering subsystem 534 may have energy metering subsystem elements 544 that include one or more usage meters or monitors, demand meters or monitors, voltage sensors or monitors or the like. A lighting subsystem 535 may have lighting subsystem elements 545 that include one or more building lighting controllers or monitors, room lighting controller or monitors, lighting power controllers or monitors, or the like. An elevator subsystem 536 may have elevator subsystem elements 546 that include one or more drive unit controllers or monitors, elevator door controllers or monitors, or the like.

In some embodiments, the utility services system 504 may have one or more utility service subsystems 514 such as waste management subsystems 551, distributed generation subsystems 552, gas subsystems 553, water subsystems 554, or the like. Additionally, each of the utility service subsystems 514 may have one or more utility service subsystem elements 524. For example, a waste management subsystem 551 may have waste management subsystem elements 561 that include one or more waste bin location tracking sensors or elements, waste level tracking sensors or detectors, or the like. A distributed generation subsystem 552 may have distributed generation subsystem elements 562 that include one or more solar power generation controllers or monitors, emergency power provision controllers or monitors, wind generation controllers or monitors, battery storage controllers or monitors, or the like. A gas subsystem 553 may have gas subsystem elements 563 that include one or more gas meter monitors or gas controllers, leak detection system monitors or controllers, or the like. A water subsystem 554 may have water subsystem elements 564 that include one or more water meter monitors or water system controllers, leak detection system monitors or controllers, water quality monitors, or the like.

In some embodiments, the safety system 506 may have one or more safety subsystems 516 such as fire alarm subsystems 581, very early smoke detection apparatus (VESDA) subsystems 582, fire suppression subsystems 583, or the like. Additionally, each of the safety subsystems 516 may have one or more safety subsystem elements 526. For example, a fire alarm subsystem 581 may have fire alarm subsystem elements 584 that include one or more power monitors or controllers, smoke detection monitors, alarm controllers or monitors, or the like. A VESDA subsystem 582 may have VESDA subsystem elements 585 that include one or more air quality monitors, power monitors or controllers, or the like. A fire suppression subsystem 583 may have fire suppression subsystem elements 586 that include one or more power monitors or controllers, heat or smoke detection monitors, or the like.

In some embodiments, the security system 508 may have one or more security subsystems 518 such as closed circuit television (CCTV) subsystems 574, perimeter sensor subsystems 575, access control subsystems 576, or the like. Additionally, each of the security subsystems 518 may have one or more security subsystem elements 528. For example, a CCTV subsystem 574 may have CCTV subsystem elements 571 that include one or more power controllers or monitors, digital video recorder (DVR) controllers or monitors, or the like. A perimeter sensor subsystem 575 may have perimeter sensor elements 572 that include one or more power controllers or monitors, movement sensors, or the like. An access control subsystem 576 may have access control subsystem elements 573 that include one or more building access controllers or monitors, door access controllers or monitors, campus access controllers or monitors, occupancy sensors, or the like.

Figure 6A:
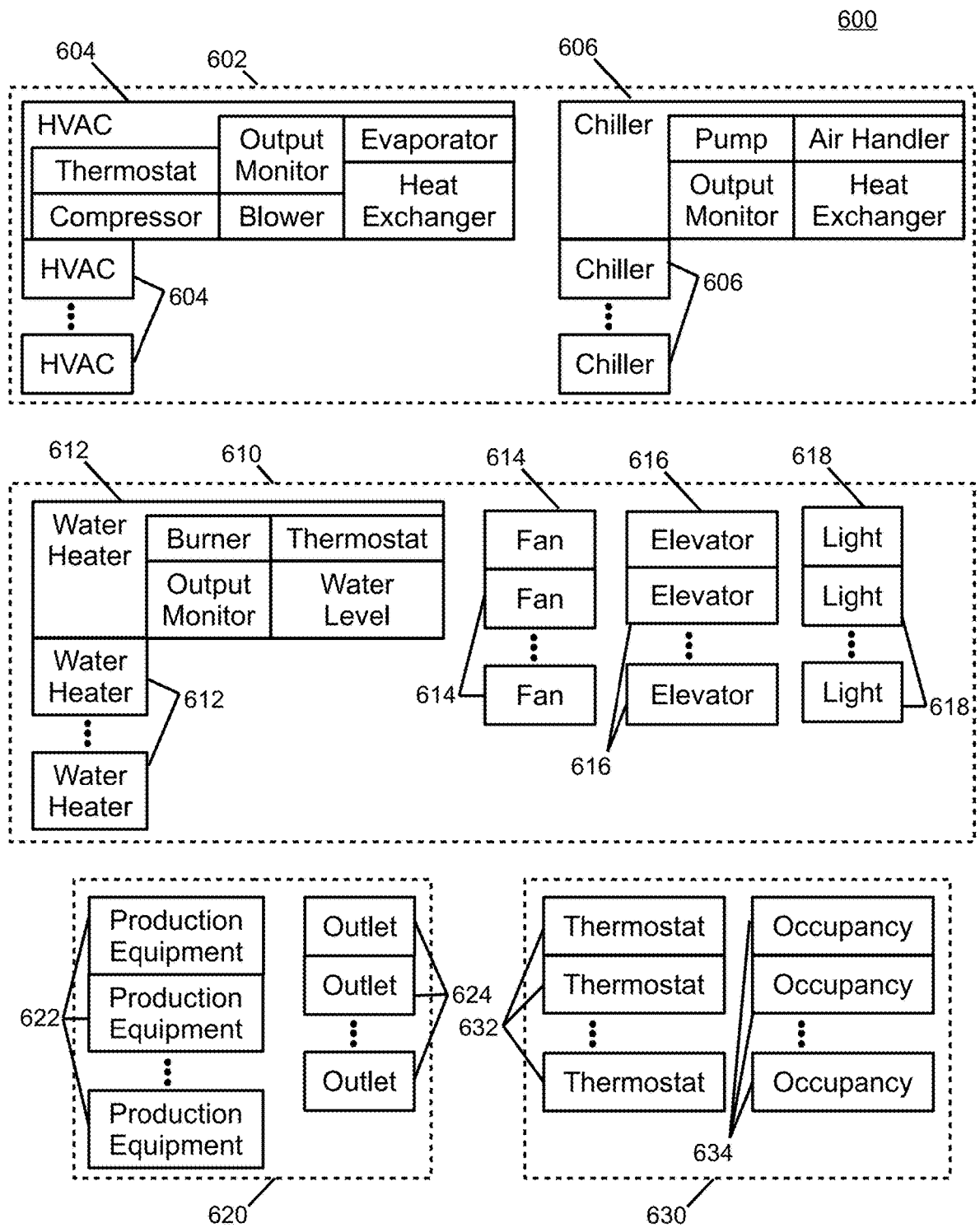
FIG. 6A illustrates a data storage arrangement for a DOC according to some embodiments.

FIG. 6A illustrates a data storage arrangement 600 for a DOC according to some embodiments. A DOC may be in signal communication with one or more facility elements such as systems, subsystems, subsystem elements, or the like, and may receive data from the facility elements. The received data may be used to monitor and control various facility elements. Each of the facility elements may have one or more associated sensors that read or gather recent performance data for the relevant facility element. In some embodiments, the DOC may store data from the facility elements, and may use the historical data, or a combination of the historical data and live or real time data, to control the facility elements. For example, the DOC may store performance data from an HVAC subsystem, and use the performance data to determine a forecast power demand for the HVAC subsystem, or for the facility as a whole. In some embodiments, forecasting the power draw of the facility as a whole permits the DOC to control power use in the facility to prevent the instantaneous power demand from exceeding a predetermined threshold such as a demand rate level. Additionally, controlling power demand may permit the DOC to improve efficiency of facility element operation, or even individual system operation. Continuous monitoring of facility elements also permits the DOC to predict facility element failures or maintenance issues. For example, monitoring of incoming power, combined with monitoring of wind speed, moisture levels, precipitation, temperature, and the like, may allow for the identification of momentary power outages, or 'blinks', due to wind-induced movement, and subsequent shorting, of power lines. Similarly, monitoring precipitation, lightning and wind levels may allow the identification of power outage causes, such as those due to lightning strikes, flooding, and the like. The identification of conditions conducive to power outages may allow automatic triggering of backup power systems or power storage systems prior to an outage to ensure uninterrupted power.

In some embodiments, the data storage arrangement 60o may include tracking of one or more systems, subsystems and subsystem elements using one or more associated data structures. The data structures may be used to track monitored systems, subsystems or subsystem elements, and data collected regarding the operational characteristics. For example, the data storage arrangement 600 may include one or more environmental control data structures 602 such as one or more HVAC data structures 604, chiller data structures 606, or the like. In some embodiments, each data structure may have elements associated with subsystem elements of a system.

In some embodiments, each HVAC data structure 604 may have, for example, data structure elements associated with subsystem elements for the HVAC subsystem such as a thermostat, compressor, blower, heat exchanger, evaporator, and output monitor sensor. Thus, the DOC may track the operational characteristics or operational history of the different elements of the system, subsystem or subsystem element associated with the relevant data structure. For an HVAC data structure 604, the DOC may continuously monitor, for example, operational characteristics of the HVAC or of HVAC subelements, and may store or handle the received data in the HVAC data structure 604. The HVAC data structure 604 may have data structure elements for data that is received at the DOC and that is associated with HVAC subelement operational characteristics for the HVAC subelements such as the current draw or voltage of a compressor, the temperature, flow rate, volume or pressure of refrigerant compressed by the compressor, or temperature of air around or cooling the compressor. Similarly, the HVAC data structure 604 may have data structure elements for data associated with HVAC subelement operational characteristics such as the current draw, revolutions per minute (RPM) voltage, air volume output, or the like, of a blower, the airflow, temperature, heat transfer rate, inlet and output temperature, or the like, of a heat exchanger, or the refrigerant pressure, refrigerant or coil temperatures, input or output air temperatures, or the like, for an evaporator. In some embodiments, The HVAC data structure 604 may have one or more data structure elements associated with data for associated output monitors, such as a system airflow volume sensor, temperature sensor, humidity sensor, air quality sensor, carbon dioxide ($CO_2$) sensor, or the like. The HVAC data structure 604 may also have one or more data structure elements for associated control features such as settings or temperature readings from thermostat or temperature sensors.

Similarly, each chiller data structure 606 may have, for example, data structure elements associated with subsystem elements for the chiller subsystem such as a one or more pumps, air handlers, output monitors or heat exchangers. Thus, the DOC may track the operational characteristics or operational history of the relevant subsystems elements of the chiller subsystem, allowing the DOC to track, for example, air temperatures, power usage, internal subsystem parameters, or the like for each subsystem element of the chiller subsystem.

The data storage arrangement 600 may also include, in some embodiments, one or more facility superintendent system data structures 610 such as one or more water heater data structures 612, fan management data structures 614, elevator management data structures 616, light management data structures 618, or the like. Each data structure may have elements associated with subsystem elements of a system, such as data structures elements for the burner, thermostat, water level, output, and the like, in the water heater data structure 612.

Additionally, the data storage arrangement 600 may include other types of data structures such as installed equipment data structures 620, facility monitoring data structures 630, or the like. For example, the installed equipment data structures 620 may include production equipment data structures 622 for monitoring the operational characteristics, such as power usage, operational state, or the like for production equipment installed by a tenant or facility occupant, such as lifts, furnaces, fabrication equipment, material handling equipment, overhead doors, or the like. The installed equipment data structures 620 may further include outlet data structures 624 for monitoring usage and power draw of power outlets in a facility. The facility monitoring data structures 630 may include thermostat data structures 632 for storing data related to monitoring of interior or exterior temperatures or selected or preferred temperatures, and occupancy sensor data structures 634 for storing data related to occupancy sensor detection of personnel in associated areas of a facility.

Figure 6B:
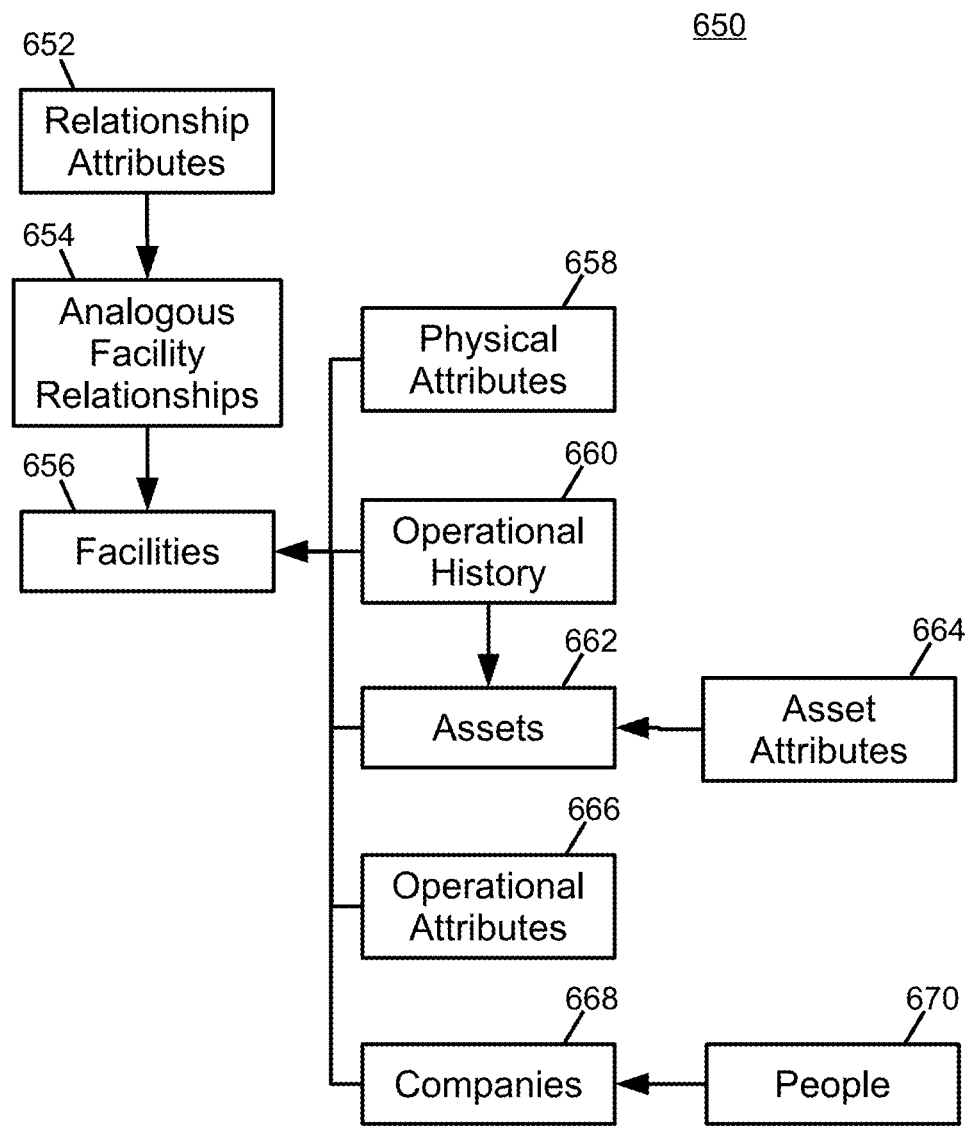
FIG. 6B illustrates a data schema for a DOC according to some embodiments.

FIG. 6B illustrates a data schema 650 for a DOC according to some embodiments. The DOC maintains the data schema 650 with associations or connections between data and data elements used by the DOC for facility management and control. The DOC may store data related to features associated with one or more facilities 656. In some embodiments, the DOC may associate one or more physical attributes 658 and operational attributes 666 with each of the facilities 656. The physical attributes 658 may be parameters such as facility size, insulation rating, facility location, and the like. The operational attributes 666 may be the facility use, operating hours, and the like.

In some embodiments, the DOC associates one or more assets 662 with each of the facilities 656, and one or more asset attributes 664 with each of the assets 662. The assets 662 may be facility elements that are monitored or controlled by the DOC, and may include systems, subsystems, system elements, installed equipment, or the like. Each asset attribute 664 may be a description or parameter associated with the relevant asset. In some embodiments, the asset attributes 664 include model identifier, serial number, output power, size, volume, or the like, input size, volume, power or the like, voltage rating, nominal operating current, power-to-output characteristics, or other operations parameters for the relevant asset 662.

In some embodiments, the DOC associates one or more companies 668 with each facility 656. Additionally, one or more people 670 may be associated with each company 668, allowing the DOC to determine when each individual is in the relevant facility, and which asset or area of the facility may be used by the relevant person. Additionally, the assets 662 may also be associated with a company 668 to allow projections for the company to be applied to assets 662.

In some embodiments, the DOC also associates operational history elements 660 with each facility 656 or asset 662. Data received from facility elements may identify the asset with which the particular data point is associated, and the DOC may store the received data point, and associate the data point in the database with the relevant asset 662 or facility 656. The operational history elements 660 comprise the received data points for a particular asset or facility 656, and form the historical performance data that may be used by the DOC to monitor the performance of the relevant asset and project performance of the asset.

In some embodiments, the DOC may identify and store one or more analogous facility relationship 654 relating two or more facilities 656. Additionally, an analogous facility relationship 654 may relate two assets for different facilities, or assets 662 for the same facility 656. Each analogous facility relationship 654 identifies a target asset or target facility and also identifies the analogous facility or analogous asset that has properties, such as historical performance, performance specifications, model number, operational characteristics, or the like, that are related to the target facility such that the performance of the analogous facility or analogous asset may be used to project future performance of the target facility or target asset. One or more relationship attributes 652 may be associated with each of the analogous facility relationships 654. In some embodiments, the relationship attributes 652 may indicate which data segments, or ranges of data categories or performance parameters, are analogous between the analogous facilities or analogous assets. For example, the relationship attributes 652 may include a correlation rate indicating the level of correlation between the analogous facilities or analogous assets. The relationship attributes 652 may also include one or more correlations indicating one or more monitored performance parameters, such as occupancy, external temperature, date or date range, or the like, a relationship between monitored performance characteristics, such as power draw to exterior temperature, power draw to output temperature, duty cycle to external temperature, duty cycle to thermostat setting, or the like, a range of the same, or one or more other performance characteristics or ranges.

Figure 7:
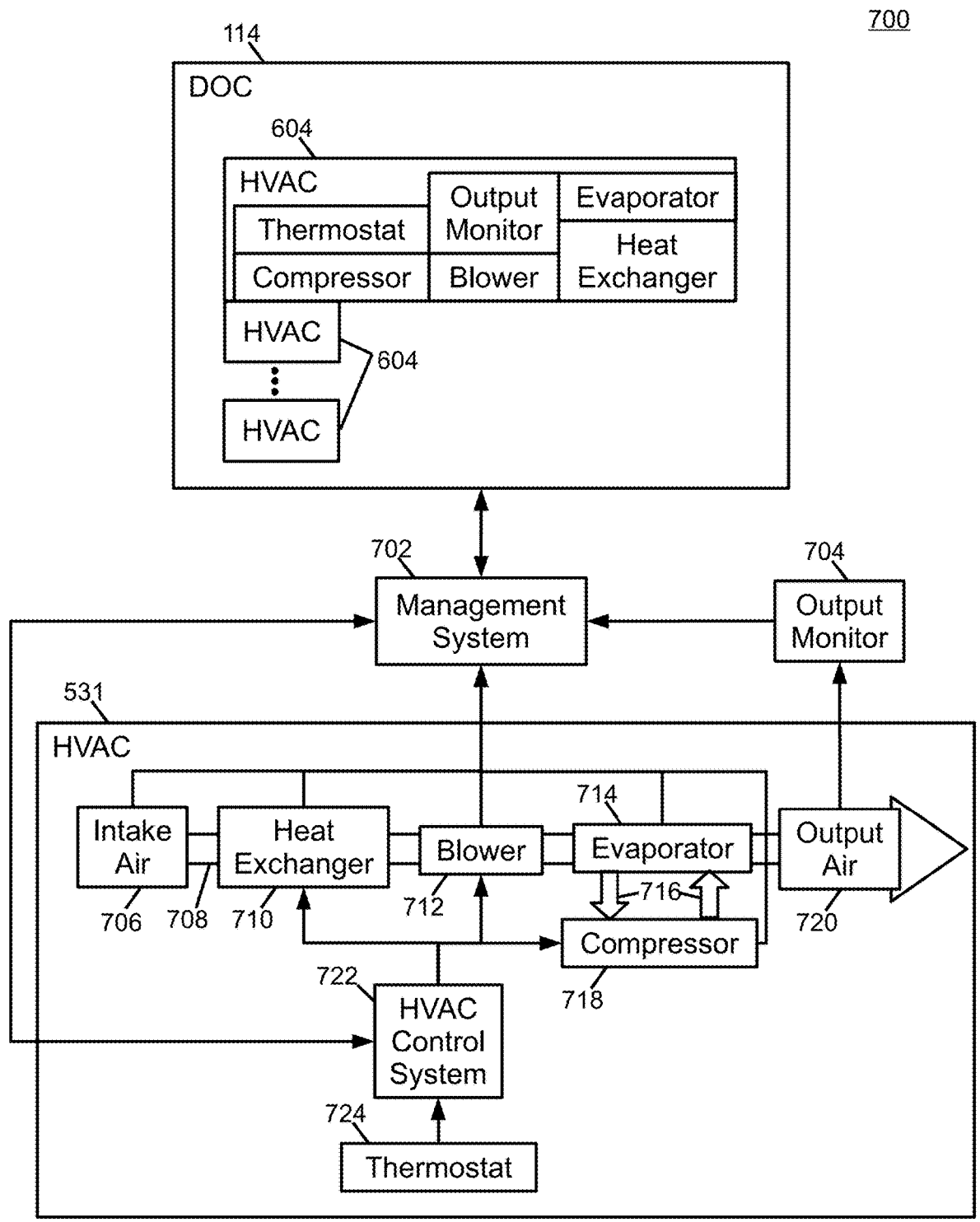
FIG. 7 illustrates a system with a DOC connected to a heating, ventilation and air conditioning (HVAC) subsystem according to some embodiments.

FIG. 7 illustrates a system 700 with a DOC 114 connected to a HVAC subsystem 531 according to some embodiments. The DOC 114 may communicate with one or more facility systems or subsystems, such as an HVAC subsystem 531. In some embodiments, the DOC 114 may communicate with the HVAC subsystem 531 through a management system 702. The management system 702 may be a facility level management system, such as a facility management system, or may be a system-level management system, such as a management system for a building management system, or may be associated with the subsystem itself, such as an HVAC management system. In other embodiments, the DOC 114 may communicate with elements of the HVAC subsystem 531, through an HVAC control system 722, or directly.

In the HVAC subsystem 531, elements of the HVAC subsystem 531 control the airflow 708 through the HVAC subsystem 531, and treat the airflow 708 to achieve the desired heating or cooling in a facility. A blower 712 may pull in intake air 706 and create airflow through the HVAC subsystem 531. The airflow 708 may pass through a heat exchanger element 710, which may heat the air, or an evaporator 714 to cool the airflow before the airflow 708 is out as output air 720 into the facility. The evaporator 714 exchanges refrigerant 716 with a compressor 718, with the compressor 718 taking in colder, uncompressed refrigerant 716, compressing the refrigerant 716, and returning compressed refrigerant 716 to the evaporator 714, where the refrigerant 716 cools as it expands, cooling the airflow 708 that passes through the evaporator 714.

The DOC 114 receives one or more data signals associated with performance characteristics of the HVAC subsystem 531 or HVAC subsystem elements. The data signals may be sent by the management system 702, or the DOC 114 may poll the management system 702 for the performance characteristics. The DOC 114 may store data from the data signals in a relevant data structure such as an HVAC data structure 604 associated with the HVAC subsystem 531 so that the DOC 114 may store instances of the data received from the management system in a database to track performance of the HVAC subsystem 531 or subsystem elements over time.

For example, the DOC 114 may periodically receive data indicating the performance characteristics for the compressor 718, evaporator 714, blower 712 and output monitor 704 to determine the power draw of the relevant elements, and temperature of the output air 720. The DOC 114 stores the data in a data structure and in the database. In some embodiments, the DOC 114 uses the received data, alone, or in combination with previous data entries, to determine the current operating state of the HVAC subsystem 531, and to project the anticipated operating state or power use of the HVAC subsystem 531 or other HVAC subsystems of the same facility or different facilities. Additionally, in some embodiments, the DOC 114 may analyze the performance characteristics of the monitored subsystem or elements and may control the relevant subsystem or elements according to the performance characteristics, or a combination of the performance characteristics and other data. For example, the DOC 114 may monitor the power usage of the blower 712 and compressor 718, and may determine the mode in which the HVAC subsystem 531, with current or recent power usage by the compressor 718, or data from the HVAC control system 722, indicating that the HVAC subsystem 531 is running in cooling mode. When the DOC 114 determines that the facility is approaching an overall power usage that is near, or is projected to exceed, a threshold such a demand rate level, the DOC 114 may send one or more commands to the HVAC control system 722, the compressor 718, the blower 712, or a combination of elements, to reduce the power usage so the facility avoids exceeding the threshold and avoid monetary penalties.

Figure 8:
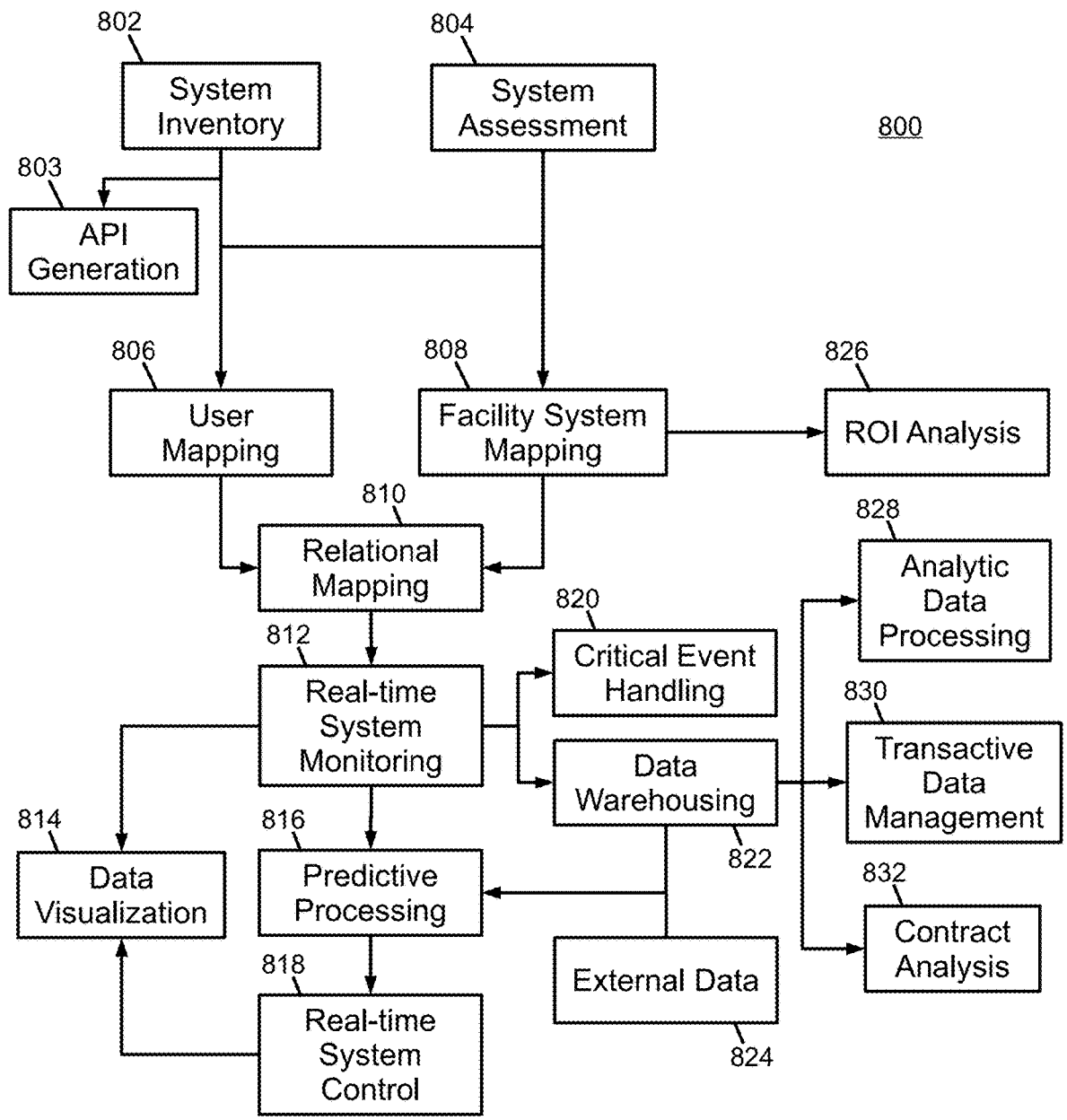
FIG. 8 is a flow diagram illustrating setup and processing of facility monitoring according to some embodiments.

FIG. 8 is a flow diagram Boo illustrating setup and processing of facility monitoring according to some embodiments. In some embodiments, a system inventory is performed in block 802 to determine the existing systems, subsystems and subsystem elements of a facility and to identify potential subsystem elements that may be monitored and controlled.

In block 803, application programming interface (API) generation may be performed. One or more APIs may be generated manually or automatically to provide translation or interoperability between the DOC or database receiving the sensor data, and each sensor. The API may provide an interface for receiving or fetching the data from the sensor, and may provide the data in a common or unified format so that the DOC or database does not need to translate the data from the sensors or system elements. In some embodiments, the APIs may be generated to account for the operating system or data output format of a sensor facility, or system, and may provide the data to the DOC or database in a standardized format by translating the sensor-specific output. In some embodiments, the sensors may use a BACnet process or system automation protocol, however, other protocols, such as MODBUS, X10, ZigBee, or the like, may be used, and a combination of protocols, depending on the sensors, facilities, and facility systems, may be used.

In block 804, a system assessment may be performed to determine what systems, subsystems and elements may need to be added or installed to provide the required monitoring and control. The system assessment may be performed during, for example, building or system design, and systems identified for their ability to provide monitoring data, or to respond to dynamic commands, may be specified for a new facility or a renovation or retrofit. Additionally, the system assessment may include specifying system features and sizing appropriate for the facility attributes, intended use, and tenant requirements. Thus, an architect or engineer may determine, for example, proper sizing of environmental systems, a lighting and security requirements, power provision suitable for production equipment or other customer requirements, and the like. Facility systems and monitoring elements may be selected to meet tenant or customer requirements, while providing the ability for DOC to dynamically monitor and control the facility subsystems. Accurately determining a system inventory and facility requirements permits an electrical service for a new building to be specified for the lower power requirements to reduce up-front capital costs, while permitting the DOC to avoid the facility's power usage from unintentionally exceeding a threshold such as a demand rate level, or physically damaging the power distribution system.

User mapping may be performed in block 806, with people, such as users or company personnel being mapped to particular equipment, areas of a facility, system, subsystem, or the like. For example, a manufacturing company may map one or more machinists to production equipment such as material handling equipment, computer numerical controlled (CNC) machines, lathes, saws, or the like. In another example, a restaurant may map kitchen staff to ovens, grills, dishwashers, walk-in coolers, or the like, and a company occupying office space may map office employees to specific offices, outlets, other office equipment, or the like. In some embodiments, user mapping may be used in conjunction with user tracking, access control, occupancy sensing, or the like, to determine whether particular facility elements such as equipment, systems, subsystems or subsystem elements are in use or likely to be used when determining the extent of control of the relevant facility elements.

Facility system mapping may be performed in block 808. On some embodiments, facility system mapping includes associating system, subsystem, and subsystem elements with each other and with a facility. Facility system mapping may use the data generated by the system inventory and system assessment to determine what facility elements are already available at a facility, and which facility elements may be added, replaced, or updated for monitoring and control. The user mapping and facility system mapping may include creating specifying data structures with relevant data elements in the database of the DOC and storing the mapping information, including identification of the users, facility elements, and relevant relationships in the DOC database.

In block 826, return on investment (ROI) analysis may be performed. The cost to install the control and monitoring, and to make an improvements or capital outlays to achieve the desired level of monitoring and control may be determined from the system assessment and system inventory, and after facility system mapping, the potential cost saving may be projected to determine whether implementing the control and monitoring systems would be cost effective.

Relational mapping may be performed in block 810. In some embodiments, relational mapping may include determining correlations between target assets and other similar assets. The target assets may be the monitored facility, or systems, subsystems or subsystem elements of the facility, and the similar assets may be other facilities, or systems, subsystems or subsystem elements of the other facility. Relationships between target assets and other assets may be determined according to relationships between the use, or intended use, of the facilities, prior performance, physical properties, location, or the like. For example, a target facility that is a retail space and that has a historical power usage similar to the power usage of an office building may be associated with that office building. However, for new installations or renovated facilities, historical power usage for the target facility may not be available, facilities may be associated according to facility use, facility size, or facility physical characteristics such as weather exposure, window coverage, equipment installations, location, facility orientation, insulation levels, or the like. A target facility that is a restaurant may be associated with another restaurant of similar size or physical characteristics.

Real-time monitoring may be performed in block 812. In some embodiments, the DOC performs the real-time system monitoring, with DOC systems receiving signals from one or more facilities. Each facility may send signals having performance data or sensor data associated with performance characteristics of one or more systems, subsystems, or subsystem elements, as well as associated data related to the performance data. For example, the facility or facility elements may periodically send near real-time data for each sensor, such as at a 10 minute interval, a 1 minute interval, or the like In other embodiments, the sensor data may be delivered in real-time. The sensor data may be delivered by the facilities or facility elements based on control by the facility or facility elements, or may be delivered in response to polling by a DOC or database.

In block 820, critical event handling is performed. In some embodiments, critical event handling may be performed in response to the DOC determining that a critical event has occurred according to data received at the DOC. The DOC may determine that a critical event has occurred when related data points received at the DOC do not match a historical pattern between the data points. The DOC may shutdown or startup a system, subsystem or subsystem element, and may also, or alternatively, notify a user or maintenance personnel, or may show a visual or audible warning on a display. For example, the DOC may receive data for an HVAC subsystem indicating that a blower uses a substantially normal amount of power, but that airflow through the system is substantially below normal, indicating an issue with the blower. Alternatively, the airflow may be normal, while the temperature of the air exiting the HVAC subsystem may be above or below normal, indicating an issue with a compressor or evaporator, or a heat exchanger. Similarly, data indicating a water heater having a burner drawing normal power or gas, but outputting water that is above or below a nominal temperature, may indicate an issue with the water heater. In some embodiments, the critical event handling may include handling alarm signals such as signals from water or gas leak detections systems, or generating an alarm based on detection data, such as occupancy sensors, smoke detector signals, or the like.

In block 822, data warehousing is performed. The DOC may receive data from one or more facilities, and may store the data in a database for reference as historical data, and for analysis for analogous facilities or structures. The DOC may format the data into data structures associated with each system, subsystem and subsystem element to normalize any incoming data provided in non-typical or different formatting. Additionally, the DOC may associate the incoming data with the relevant facility, system, subsystem or subsystem element, and may also provide a time stamp, identifier, or other relevant identifying information for the data.

In block 828, analytic data processing may be performed. Analytic processing of the historical data stored by the DOC may be used to analyze performance, efficiency, or ROI of monitored features, of the like. In block 832, contract analysis may be performed. In some embodiments, the DOC, or a related system, may compare the stored data to requirements of one or more contracts to determine whether the relevant system has met requirements of the respective contract.

In block 830, transactive data management may be performed. In some embodiments, the transactive data management includes handling transactions performed according to the stored performance data. For example, the stored data may indicate that a facility is projected to have a power demand below a power use threshold, and that further indicates that stored power, for example, power stored in a battery array, or protected power production in a distributed power system, when considered in view of a wholesale spot power price, would be economical to sell power back into a grid. The transactive data management may include verifying pricing and available power sales, and may handle the sale and connection of stored power or generated power to the grid. Similarly, the transactive data management may use a projected power use for a facility to determine whether to purchase power, or pull power from the grid to charge a power storage system prior to a projected high power usage period, or prior to a projected period of low power generation by a distributed power generation system. Thus, if the DOC determines that weather, such as cloud cover or non-advantageous winds, would result in solar or wind generation subsystems not providing power sufficient to charge a power storage subsystem to a level projected to be necessary for future facility needs, the DOC, or an associated system, may perform transactive data management by buying power from the grid to charge a power storage subsystem and potentially avoid the need to reduce power usage to avoid a power usage exceeding a threshold.

In block 824, external data is retrieved. In some embodiments, the external data may be forecast data, such as a weather forecast data, economic forecast activity, tourism planning data, or the like. The external data may, in some embodiments, include data related to facilities, systems, subsystems, and subsystem elements.

In block 816, predictive processing may be performed. In some embodiments, the predictive processing may be performed according to one or more of the most recent or current performance data received at the DOC, historical performance data, or external data, and may be used to generate predicted performance data for a system, subsystem, or subsystem element. In some embodiments, historical data may be retrieved according to at least one of the current performance data or the external data. Additionally, in some embodiments, the recent performance data may be the performance data from the most recent performance reading, and may be current performance data, or may be delayed by some time period.

In some embodiments, the DOC may retrieve historical performance data from a database or data storage according to the recent performance data, associated data and external data. The DOC may retrieve historical data according to the recent performance data and the external data. For a target subsystem, the DOC may retrieve historical performance data for relevant parameters affecting the target subsystem performance. The historical performance data may be for the target facility, for an analogous facility, or a combination of the target facility and an analogous facility. In some embodiments, the DOC may average multiple instances of historical performance data to determine the average performance of the target subsystem under specific conditions analogous to the current conditions of the target facility. In some embodiments, the DOC may attempt to retrieve the relevant historical data for the target subsystem. However, where the desired number of instances of the relevant historical data is not available for the target subsystem, the DOC may use the existing instance of relevant historical data for the target subsystem, the DOC may supplement the historical data with historical data for an analogous system.

The DOC may then generate projected performance data according to the historical performance data. In some embodiments, the projected performance data may be a projected utility usage, data indicating a monitored performance parameter will exceed a threshold, or the like.

In block 818, real time system control is performed. In some embodiments, the DOC uses projections generated as a result of the predictive processing in block 816 to determine whether operation of a monitored asset will exceed a threshold. For example, a DOC monitoring power usage of a facility may use a projected power usage to determine whether the facility is projected to exceed a predetermined threshold such as a demand rate level, or the like. The DOC may send a signal, command, instruction or the like, to a facility to control one or more facility elements such as a system, subsystem, subsystem element, or the like, to adjust operational parameters, such as a power usage level, power usage timing, or operational state of the relevant facility element. In some embodiments, the DOC may override a setting on a facility element to adjust the facility element power usage parameter. In other embodiments, the DOC may override operating parameters or settings by, for example, adjusting the timing of when a facility element activates or runs to synchronize the times that different facility elements run to avoid the instantaneous overall power draw from exceeding the predetermined threshold. In other embodiments, the DOC may control a facility element such as an outlet, light fixture, installed equipment, or the like, to turn off the feature to ensure that the facility element is not used during the power control period, and to ensure that the device does not draw parasitic power even when asleep or otherwise not in use.

The DOC may determine which facility elements can be adjusted, synchronized or turned off according to the nature of the relevant feature, the anticipated or observed use of a feature or occupancy of an area associated with the feature, a setting provided by a company or occupant, or the like. Additionally, the extent or magnitude of the control may be associated with a user tolerance for the change, a minimum allowable use for the facility element, or the like.

The DOC may further perform predictive processing to determine projected power usage whether the real-time system control will reduce or adjust power usage enough to avoid exceeding the predetermined threshold. The DOC may monitor power usage during the real-time control adjustment of operation of the facility elements to determine whether the projected usage accurately predicts the actual usage, and may adjust the control of the facility elements to achieve the desired power usage reduction or control.

In block 814, data visualization may be provided to one or more users. In some embodiments, the data visualization may include current data received by the DOC as part of the real time monitoring, and may include at least a portion of the historical performance data stored in the database or data warehouse. The data visualization interface may also include a display of processed or derived data that is processed or derived according to the current and historical performance data. For example, the DOC may derive an efficiency metric from the current and historical performance data, and may display the efficiency data to a user. The DOC may also display data related to the projected performance data, or data related to the proposed adjustment or modifications to the operation of facility elements under the real time system control.

In some embodiments, the DOC may also provide an interactive user interface allowing the user to submit commands, instructions, or the like, to control or manage features of a facility in order to preempt or override the current operating state of a facility element, to override or supplement a command sent from the DOC as part of the real time system control, or the like. In some embodiments, the DOC may override the current operating state of the facility element or a setting or operating parameter associated with the facility element according to a user setting. For example, a user at a DOC may observe that the DOC projects that a retail establishment is experiencing above average power usage, and will exceed a demand rate level later in the day.

Figure 9:
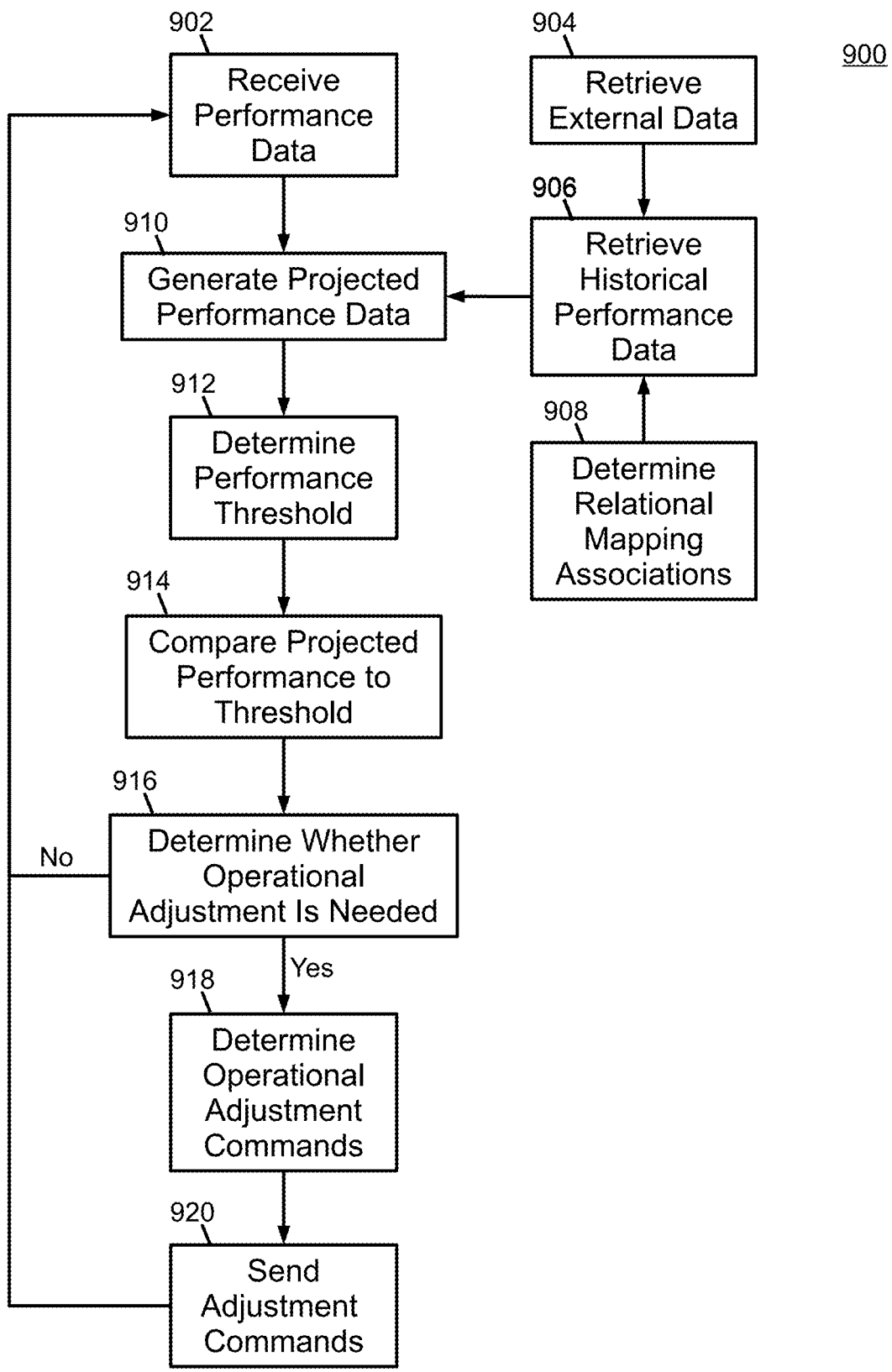
FIG. 9 illustrates a method for command and control of facility elements according to some embodiments.

FIG. 9 illustrates a method 900 for command and control of facility elements according to some embodiments. In block 902, the DOC receives performance data from one or more facilities. Sensors associated with systems, subsystems, or subsystem elements may generate data that is sent to the DOC for later storage and analysis. In some embodiments, a management system or control system may gather data from one or more sensors and provide the data periodically, or in response to a poll or request from the DOC. In some embodiments, the data is sent to the DOC as a signal having the sensor data, or data associated with the sensor data. In other embodiments, the DOC may receive data from the sensors in a signal, with the data associated with the sensor reading.

For example, a restaurant facility may have a management system that retrieves performance characteristic data from one or more HVAC subsystems, for one or more light subsystems, for one or more outlets, for one or more occupancy sensors, for installed equipment such as walk-in coolers, ovens, stoves, or the like, and sends the performance data to the DOC. The management system may also gather the associated data and send it to the DOC, for example, gathering weather information such as external temperature, cloud cover, solar radiation, rainfall, barometer pressure, wind direction and speed, and the like, so that the DOC may correlate performance of the subsystem with any related external variables. For example, HVAC performance or use may be strongly correlated with occupancy, as well as external temperature or solar radiation, while, for some facilities such as restaurants, occupancy may be correlated to rainfall or external temperature. Thus, occupancy may be monitored in a public space by, for example, cell phone signal identification to estimate the number of unknown occupants that may be present, and may proactively reduce the power demand by an HVAC system when few occupants are detected.

For example, the DOC may receive a signal having current or recent performance data indicating a thermostat setting, output temperature and air flow rate for an HVAC subsystem operating, as well as current draw or power usage for each of a blower subsystem element of the HVAC subsystem and a compressor subsystem of the HVAC subsystem, airflow rate, intake out and out temperatures, and the like. The signal received by the DOC may also include associated data, such as data indicating readings and settings from a thermostat, local external weather data such as a temperature, solar radiation, humidity, or the like.

In block 904, the DOC may retrieve external data. In some embodiments, the type of external data may be identified when the monitored facility element is identified, and the external data may be associated with the target or monitored facility element. For example, the external data may be forecast data, such as a weather forecast data, economic forecast activity, tourism planning data, or the like, and the external data may be identified as the weather forecast data when an environmental control element is identified as the monitored facility element. The external data may, in some embodiments, include data related to facilities, systems, subsystems, and subsystem elements. For example, the external data may include performance specifications for a compressor, blower, or heat exchanger for an HVAC subsystem, and the DOC may retrieve data related to power draw at nominal operation, or power draw specifications for various input temperatures or output temperatures. Additionally, the external data may include data associated with one or more other asset properties such as a model identifier, serial number, manufacturer, class of asset, or the like.

In block 908, the DOC may determine relational mapping associations. In some embodiments, the relational mapping associations are determined on demand or on-the-fly when needed for retrieving historical performance data or generating projected performance data. In other embodiments, the relational mapping associations are determined when a facility is mapped, or a system is set up for monitoring and control of a facility, or may be periodically determined or updated according to new performance data. The DOC may relate notes, such as facilities, facility systems, subsystems or elements according to one or more characteristics such as past performance, manufacturer specifications, model, environmental or load characteristics, or the like.

In some embodiments, relational mapping associations are determined for a particular facility according to historical performance data for one or more facilities. In some embodiments, a DOC or related system may identify the one or more analogous facility elements according to a correlation between at least one of historical performances in related environments of a target facility element and the one or more potentially analogous facility elements, according to physical characteristics of the target facility element and one or more potentially analogous facility elements, according to operational characteristics of the target facility element and one or more potentially analogous facility elements. A facility being monitored may be a target facility, and a system such as a monitoring and control element may monitor one or more other facility elements, and use the monitored facility elements as potentially analogous facility elements. The system may identify the one or more analogous facility elements as a facility element that is selected from one or more facility elements being monitored by a DOC and that is selected as the facility element that is selected from one or more facility elements having a performance that most closely matches the performance of the first facility element for a performance parameter range.

The DOC may compare the historical performance data of each potentially analogous facility element to the performance data of the target facility element to determine how closely the target facility performance correlates to the historical performance data of another facility, with a relationship being identified for the highest correlation. For example, the DOC may identify one or more HVAC subsystems that are analogous for a relevant forecast temperature, or that are analogous based on the physical properties, usage, type of building, occupancy load, or the like, of the facilities in which the HVAC subsystems are located. Additionally, the relationship may be determined for particular operating environments or discrete data segments, and different relationships identified for different data segments. Thus, analogous facility features may be facilities features that are projected to have analogous performance, with the projected analogous performance determined according to a correlation between historical performances of the facility features in related environments, physical or operational characteristics of the facility features, or the like.

The data may be delineated by different data categories, and each category may be segmented as well, to identify different performance parameter ranges. For example, environmental control performance of a target HVAC subsystem in a target facility may be continuously monitored with respect to a load parameter, an external temperature, solar radiation value, wind speed or direction, occupant load, equipment usage load, or the like. The target HVAC subsystem performance for a target facility may then be compared to historical performance data of other facilities, and a relationship identified between the target facility and a related or analogous facility for each data segment. Thus, in some embodiments, performance data for HVAC subsystems, such as power draw with respect to exterior temperature, may be compared to determine the correlation between the HVAC subsystems. For example, a target HVAC subsystem at the target facility may relate most closely to an analogous HVAC subsystem at a first analogous property for a performance parameter range, or segment of the data, such as for a range of temperatures, dates, or the like. The relationship between the target HVAC subsystem and analogous system may be based on the performance of the HVAC subsystems, the similarities of HVAC subsystems, the physical or performance characteristics of the HVAC subsystems, or the like. For example, a candidate HVAC subsystem may be identified from one or more HVAC subsystems being monitored by a DOC as an analogous system to a target HVAC subsystem when the candidate HVAC subsystem is the same model, or a related model, as the target HVAC subsystem. In some embodiments, the candidate subsystem having the performance that most closely matches the performance of the target system for a particular data segment may be identified as an analogous system for that data segment. Additionally, there may be multiple relationships between a target subsystem and analogous systems, with a different relationship to a different analogous subsystem for different data segments.

For example, in an HVAC subsystem, the DOC may have first historical performance data for the target HVAC subsystem indicating an output air temperate of 62° F., a blower current draw of 20 amps with a duty cycle of 50%, and a compressor current draw of 40 amps with a duty cycle of 40% for an external temperature of 85° F. The DOC may further have second historical performance data for the target HVAC indicating an output air temperature of 62° F., a blower current draw of 20 amps with a duty cycle of 55%, and a compressor current draw of 40 amps with a duty cycle of 42% for an external temperature of 92° F., and third historical performance data for the target HVAC subsystem indicating a blower current draw of 21 amps with a duty cycle of 90%, and a compressor current draw of 42 amps with a duty cycle of 80% for an external temperature of 98° F.

In this example, the DOC may use other HVAC subsystems for other facilities, or for the same facility, as potentially analogous systems, and may compare historical performance data of the potentially analogous systems to the historical performance data of the target HVAC subsystem. The data segment of performance parameter range for the target HVAC may be a range of environmental variables or factors affecting performance of the target system, which in this example, is external temperature, which affects the current draw and duty cycle of the relevant system elements, namely the compressor and blower. The DOC may identify the performance characteristics from the historical performance data that is most greatly affected by the environmental variable affecting the performance of the target system, and may use that performance characteristic as the primary point of comparison. However, in some embodiments, the DOC may also use other performance characteristics as secondary points of comparison. In the aforementioned example, the duty cycle varies most widely with respect to the primary environmental variable of concern, the external temperature, and thus, may be used as the primary point of comparison. Thus, the DOC may determine that the voltage and current draws for the compressor and blower are generally the same for the different external temperatures, and may compare the duty cycles of the target HVAC subsystem to the duty cycles of candidate HVAC subsystems for the same performance parameter range. In some embodiments, the DOC may determine the candidate element with the performance closest to the historical performance of the target subsystem within the performance parameter range, or in a portion of the performance parameter range. In other embodiments, DOC may limit the identification of the analogous subsystem to candidate elements having historical performance that matches the historical performance of the target subsystem to a degree that falls within a predetermined or identified tolerance, which may avoid identifying an analogous system that has a poor match simply because it was the only system under consideration or was otherwise the best match from multiple poor matches. In some embodiments, the DOC may identify different candidate elements as analogous systems for different data segments. For example, in the HVAC system above, the DOC may identify a first analogous HVAC subsystem for a first target HVAC subsystem performance parameter range of 85° F.-92° F., and a different, second analogous HVAC subsystem for a second target HVAC subsystem performance parameter range of 92° F.-98° F., with the different analogous HVAC subsystems having historical performance matching the historical performance of the target HVAC system most closely in the different performance parameter ranges.

In some embodiments, relational mapping may be performed using machine learning, an iterative process, by comparison of all existing facility data sets to the target facility data set, or the like. For example, a system having some historical performance data for one or more facilities may compare the historical performance data to the performance data of the target facility to determine how closely the target facility performance correlates to the historical performance data of another facility, with a relationship being identified for the highest correlation. In a machine learning system, the system may use the average performance compared to the nominal or manufacturer specified performance to determine how adjustment of operation should be performed. Similarly, a machine learning system may monitor performance under various conditions to determine the needed performance for projected conditions, such as temperature forecasts, or to determine whether a particular facility element is operating at an inefficient or unexpected level, which may indicate a failure in the element or that maintenance is needed. For example, a blower unit that has a reduced airflow reading, but that is not exhibiting aberrant electrical usage, may indicate a duct blockage, while a reduced airflow volume, coupled with a power draw that is high for the particular operating conditions may indicate a worn motor or other potential system failure. In some embodiments, the machine learning system may set performance monitoring thresholds for facility elements based on manufacturer's specifications, and may use the operational history of the respective element to determine whether an error condition, warning condition, or other problem exists. Depending on the particular element and feature, the machine learning system may alert an operator for manual action, or may take an automated action to adjust operation of the facility element, or the like.

In block 906, the DOC may retrieve historical performance data. In some embodiments, the DOC may retrieve historical performance data from a database or data storage according to the recent or current performance data, associated data and external data. For example, where the DOC is performing predictive processing for an HVAC subsystem, the DOC may retrieve external weather forecast data indicating forecast temperatures over time for a particular time period, such as eight hours, one day, or the like. The DOC may then retrieve historical data according to the current performance data and the external data. For the HVAC subsystem, the DOC may retrieve historical performance data for relevant parameters affecting the HVAC subsystem performance, such as the current exterior temperature and forecast exterior temperatures. The historical performance data may be for the target facility, for an analogous facility, or a combination of the target facility and an analogous facility. In some embodiments, the DOC may average multiple instances of historical performance data to determine the average performance of an HVAC subsystem under specific conditions analogous to the current conditions of the target facility. In some embodiments, the DOC may attempt to retrieve the relevant historical data for the target HVAC subsystem. However, where the desired number of instances of the relevant historical data is not available for the target HVAC subsystem, the DOC may use the existing instance of relevant historical data for the target HVAC subsystem, the DOC may supplement the historical data with historical data for an analogous system.

For example, the DOC may retrieve forecast data for a facility indicating that the facility is forecast to experience temperatures of 97 degrees Fahrenheit (° F.). In this example, the DOC may use 3 instances of historical data for performance of the HVAC under similar or analogous conditions to project the target facility's performance under the forecast weather conditions. The DOC may attempt to retrieve the desired 3 instances of historical performance data for the target HVAC subsystem. In some embodiments, the DOC may attempt to use a range of performance parameters to retrieve the historical performance data. In the example where the weather is forecast to be forecast to be 97° F., the DOC may attempt to retrieve historical performance data matching the forecast weather using a range of performance parameters, for example, a historical data retrieval range that is −1% to +3% of the forecast temperature, or about 96° F.-100° F. If the DOC locates sufficient performance data associated with the target HVAC subsystem, the DOC may then use the retrieved instances of system power usage to project how much power the target HVAC subsystem will draw when the weather reaches the forecast temperature. If the DOC does not locate sufficient performance data associated with the target HVAC subsystem, the DOC may use the data the DOC was able to retrieve for the target HVAC subsystem, and retrieve historical data reported for a similar environment for the analogous facility. Thus, if the DOC finds instances of the blower and compressor power draws and duty cycles for the target HVAC subsystem for the identified forecast temperature, or for the range including the forecast temperature that does not satisfy the desired number of data instances, the DOC may then attempt to retrieve historical performance data reported by an analogous facility or HVAC subsystem for the forecast temperature, by using the historical data retrieval range determined for the target HVAC subsystem, or another range.

In block 910, the DOC may generate projected performance data. In some embodiments, the DOC uses the retrieved historical performance data to project future performance of the monitored facility element. For a facility element being monitored for power use, the DOC may project the power use of the element, and combine that projected power use with a current power use or projected power use for other facility elements to determine an overall power usage for the facility, which may be used to determine whether the power usage is likely to exceed a threshold such as a demand rate level.

Returning to the example of the HVAC subsystem with a forecast temperature of 97° F., if the DOC, for example, finds a single entry of historical performance data for the target HVAC subsystem at a related temperature, the DOC may use performance data from the analogous system to more accurately project the anticipated power draw of the target HVAC subsystem at the forecast temperature. Thus, where the single entry of historical performance data is for an external temperature of 98° F. with a blower current draw of 21 amps with a duty cycle of 90%, and a compressor current draw of 42 amps with a duty cycle of 80%, the DOC may retrieve similar historical performance data for the analogous system, and average or interpolate the historical performance data of the target system and analogous system to generate the projected power use for the target HVAC subsystem. For example, the DOC may retrieve data for previously identified analogous HVAC subsystem that has historical performance data for the target HVAC subsystem with a first analogous data entry for 96° F. with a blower current draw of 21 amps with a duty cycle of 80%, and a compressor current draw of 42 amps with a duty cycle of 70% and a second analogous data entry for 99° F. with blower current draw of 22 amps with a duty cycle of 93%, and a compressor current draw of 43 amps with a duty cycle of 84%. In such an example, the DOC may average the current draws and duty cycles of the retrieved data entries to get a projected blower current draw of 21.3 amps with a duty cycle of 87.7%, and a projected compressor current draw of 42.3 amps with a duty cycle of 78%. In another example, the DOC may apply a curve fitting process to determine the projected current draw and duty cycle for the blower and compressor at the projected external temperature. Alternatively, the DOC may determine a generalized formula based on the retrieved historical performance data, and then use the generalized formula to project the current draw and duty cycle for the blower and compressor at the projected external temperature.

In block 912, the DOC may determine a performance threshold. In some embodiments, the DOC may determine a performance threshold according to the type of facility elements being monitored. For example, a DOC monitoring power usage of a facility, and the power usage of the HVAC subsystems of the facility, may use an electricity demand rate level as the performance threshold, or may use a performance threshold associated with the electricity demand date level. For example, a facility may have a 200 Amp electricity demand rate level, at which demand rate charges are applied, and the DOC may use the electricity demand rate level as the performance threshold. Alternatively, the DOC may use a predetermined portion of the electricity demand rate level and the performance threshold. For example, the DOC may set the performance threshold to 95% of the electricity demand rate level to ensure that minor power usage projection inaccuracies do not cause the power usage for the facility to exceed the electricity demand rate level. In another example, the DOC may monitor use of other utilities, such as gas, water, or the like, and may use a threshold associated with the other utility as the basis for the performance threshold.

In block 914, the DOC may compare the projected performance data to the performance threshold. The DOC may determine whether the monitored facility usage, including the projected performance data, will meet or exceed the identified performance threshold. In some embodiments, the DOC may determine the overall utility usage for the monitored utility in view of, or according to, the projected performance data. In some embodiments, the DOC may determine the current or projected power usage for a facility and may project the overall power usage for the finality at a particular time by adding in the projected performance data. For example, the DOC may project the overall power usage for the facility, including the projected power usage for an HVAC, and compare the overall power usage for the facility to the identified performance threshold. Where the DOC monitors a duty cycle of an HVAC subsystem, the DOC may assume that the highest current usage is during an "on" portion of the duty cycle, and add the current usage for elements of the HVAC system during the "on" portion of the duty cycle to the power usage projected for the remainder of the facility. In another example, a DOC monitoring a facility with multiple HVAC systems may assume that all of the monitored HVAC systems may turn on simultaneously, and add all of the projected power usage currents for the HVAC systems to the projected power usage for the remainder of the facility elements to determine the overall projected power usage for the facility, and may use the overall projected power usage for the facility as a comparison to the identified performance threshold.

In block 916, the DOC may determine whether operational adjustment is needed. The determination of whether operational adjustment is needed may be made according to the comparison of the projected utility usage to the performance threshold. Thus, in some embodiments, if the DOC determines that an overall power usage is projected to exceed the performance threshold, the DOC may determine to perform operational adjustment.

In block 918, the DOC may determine operational adjustment commands. The determination of the operational adjustment commands may be made in response to determining to make the operational adjustment. In some embodiments, the operational adjustment commands may include commands to reduce current usage, reduce a duty cycle, change or synchronize a duty cycle, turn off a feature, or the like. For example, a blower element that has operational characteristics indicating the blower element may be run at variable speed may have operational commands determined that instruct the blower element to run at a lower speed, drawing less current. In another example, a compressor unit that may not be able to run at variable speed may have operational commands determined that change or shorten the duty cycle of the compressor. In another example, a facility having multiple HVAC subunits may have operational commands determined for the different HVAC subunits that synchronize the duty cycles of the HVAC subunits or elements of the HVAC subunits so that so that one or more of the HVAC subunits or elements of the HVAC subunits run sequentially, or non-simultaneously, to control the number of HVAC units running at any particular time. In yet another example, the DOC may determine operational commands to turn off a facility feature, such as a light system, outlet, water heater, HVAC unit or HVAC element, or the like.

In some embodiments, the DOC may determine the operational command according to a projected adjusted utility usage level, according to one or more user settings, or the like. For example, the DOC may determine that a facility is projected to exceed a performance threshold, and may determine an adjustment to the duty cycles or operating speeds to reduce the instantaneous current to a level where the facility's overall power use does not exceed the performance threshold. For example, in a facility with four HVAC subunits may determine the power usage for shortening and synchronizing the duty cycles of the HVAC subunits to run two of the HVAC units at a time, and then running the other two HVAC subunits, and if the change to the duty cycles is not projected to lower the facility's overall power usage, may determine whether another arrangement, such as changing the duty cycles of the HVAC subunits to run one HVAC subunit at a time will keep the facility's overall power usage below the performance threshold.

Additionally, the DOC may combine multiple modes of lower lowering the power usage for a facility element, such as lowering an operating speed of a blower of HVAC subunits, as well as synchronizing the run times or duty cycles of the HVAC units.

The DOC may also limit changes or adjustments to operation of facility features according to one or more user settings.

For example, the user may observe that the DOC intends to reduce climate control run times to a point where the occupants of the building would be unable to use the facility, and the DOC may limit the reduction in power usage according to the user setting, and may change the target of the power usage reduction by, for example, adjusting a secondary facility element, in combination with, or in place of, adjustment to the air conditioning facility element turning off or reducing a lighting level of an unused or underused area. In such an example, the setting associated with the facility element may be a thermostat setting for the air conditioning facility element, and a user setting may be a user satisfaction level or maximum allowable facility temperature, and the DOC may use the user setting as a bound or limit on the performance resulting from adjustment of the facility feature operating temperature. In this case, a user may have a setting that, for example, an interior temperature should not exceed 80° F., while a thermostat setting may be set to 70° F. Thus, the DOC may override the thermostat setting to control power usage of the air conditioning unit, but may monitor the resulting interior temperature to ensure that the interior temperature does not rise above the user setting of 80° F. In another example, example, the DOC may determine to reduce the power usage by limiting the run times of the air conditioning. However, the user may have been notified that the retail establishment is preparing for a party, and has agreed to incur the demand rate charges.

The DOC may then attempt to control other facility elements, such as lights, water heaters, outlets, or the like, to maintain the facility's overall power usage below the performance threshold.

In block 920, the DOC may send the operational adjustment commands. The DOC may send the operational adjustment commands directly to a subsystem or subsystem element for direct control of the relevant facility element, or may send the operational commands to a facility control system or management system, a subunit control system, or the like.

While the foregoing example is given in terms of an HVAC subunit's blower and compressor current draw and duty cycle, it should be understood that the foregoing example is not intended to be limiting. The projections may be performed for any performance parameter, and may use any relevant environmental variable or historical performance data. For example, the humidity and temperature, rather than just the temperature, may be used to calculate or project the current draw and duty cycle of the target HVAC subsystem elements, or the effective cooling efficiencies of the overall system may be used as a performance metric for determining the projected power usage of the HVAC subsystem. Similarly, a boiler or heating system may have a gas or power usage projected based on weather variables such as temperature, but also based on wind, precipitation, snow depth or ice coverage, or then like. In another example, a projected occupancy load may be used to project the cooling or heating requirements for a building, or the demand for hot water for restrooms, or power demand for production equipment in a restaurant, or the like.

An embodiment system includes a first facility element having a sensor associated therewith and configured to generate recent performance data associated with a system of a facility, and a monitoring and control element in signal communication with the first facility element, where the monitoring and control element is configured to identify one or more analogous facility elements that are analogous to the first facility element, receive the recent performance data for the first facility element, generate projected performance data for the facility element according to historical performance data associated with the facility element and the one or more analogous facility elements, compare the projected performance data to a performance threshold, and override at least one of a setting or operating parameter of the first facility element according to a relationship of the projected performance data to the performance threshold and by sending one or more operational adjustment commands to at least one second facility element.

In some embodiments, the monitoring and control element being configured to identify the one or more analogous facility elements includes the monitoring and control element being configured to identify the one or more analogous facility elements according to a correlation between at least one of historical performances, in related environments, of the first facility element and the one or more analogous facility elements, one or more physical characteristics of the first facility element and the one or more analogous facility elements, or operational characteristics of the first facility element and the one or more analogous facility elements. In some embodiments, the monitoring and control element is configured to identify the one or more analogous facility elements as a facility element that is selected from one or more facility elements being monitored by a DOC and that is selected from the one or more facility elements as the facility element having a performance that most closely matches the performance of the first facility element for a performance parameter range. In some embodiments, the monitoring and control element being configured to generate the projected performance data includes the monitoring and control element being configured to generate the projected performance data for the first facility element according to the historical performance data associated with the facility element and the one or more analogous facility elements and further according to external data associated with operating parameters of the first facility element. In some embodiments, the first facility element is a part of an environmental control apparatus, where the historical performance data associated with the facility element is historical power usage data associated with the facility element, where the external data includes a weather forecast including a forecast external temperature for an environment associated with the facility element, where the recent performance data comprises data associated with power usage of the first facility element, where the monitoring and control element being configured to receive the recent performance data includes the monitoring and control element being configured to receive the recent performance data and associated data including at least an external temperature for the environment associated with the first facility element, and where the monitoring and control element is further configured to retrieve the historical performance data according to the recent performance data, the associated data, and the external data. In some embodiments, performance threshold is a demand rate level.

An embodiment apparatus includes one or more processors, and a non-transitory computer-readable storage medium storing a program to be executed by the one or more processors for management of a smart facility, the program including instructions for receiving recent performance data for a facility element, generating projected performance data for the facility element according to historical performance data associated with the facility element, determining whether operational adjustment of the facility element is needed according to the projected performance data, determining, in response to determining that the operational adjustment of the facility element is needed, one or more operational adjustment commands, and sending, to a system controlling operation of the facility element, the one or more operational adjustment commands.

In some embodiments, the recent performance data includes data associated with power usage of the facility element, and the instructions for determining whether operational adjustment of the facility element is needed include instructions for determining that operational adjustment of the facility element is needed in response to the projected performance data indicating that power usage of the facility element is projected to exceed a demand rate level. In some embodiments, the instructions for generating the projected performance data for the facility element include instructions for generating the projected performance data for the facility element according to historical performance data associated with the facility element and further according to external data associated with operating parameters of the facility element. In some embodiments, the external data includes a weather forecast including a forecast external temperature for an environment associated with the facility element. In some embodiments, the facility element is a part of an environmental control apparatus, and the historical performance data associated with the facility element is historical power usage data associated with the facility element. In some embodiments, the recent performance data includes data associated with power usage of the facility element, where the instructions for receiving the recent performance data include instructions for receiving the recent performance data and for receiving associated data including at least an external temperature for the environment associated with the facility element, and where the program further includes instructions to retrieve the historical performance data according to the recent performance data, the associated data, and the external data. In some embodiments, the instructions to retrieve the historical performance data include instructions to retrieve facility historical performance data that is from within a predetermined time period and that is for the facility element. In some embodiments, the instructions to retrieve the historical performance data include further include instructions to determine a count of instances of the facility historical data from within the predetermined time period and that is for the facility element, and retrieve, in response to the count of instance of the facility historical performance data being lower than a predetermined threshold, analogous historical data from within the predetermined time period and that is for an analogous facility element.

An embodiment method includes receiving recent performance data for a facility element, generating projected performance data for the facility element according to historical performance data associated with the facility element, determining whether operational adjustment of the facility element is needed according to the projected performance data, determining, in response to determining that the operational adjustment of the facility element is needed, one or more operational adjustment commands, and sending, to a system controlling operation of the facility element, the one or more operational adjustment commands.

In some embodiments, the generating the projected performance data for the facility element includes generating the projected performance data for the facility element according to historical performance data associated with the facility element and further according to external data associated with operating parameters of the facility element. In some embodiments, the recent performance data includes data associated with power usage of the facility element, where the external data includes a weather forecast including a forecast external temperature for an environment associated with the facility element, where the facility element is a part of an environmental control apparatus, and where the historical performance data associated with the facility element is historical power usage data associated with the facility element. In some embodiments, the receiving the recent performance data includes receiving the recent performance data and receiving associated data comprising at least an external temperature for the environment associated with the facility element, and the method further includes retrieving the historical performance data according to the recent performance data, the associated data, and the external data. In some embodiments, the retrieving the historical performance data comprises retrieving facility historical performance data that is from within a predetermined time period and that is for the facility element. In some embodiments, the retrieving the historical performance data includes determining a count of instances of the facility historical data from within the predetermined time period and that is for the facility element, and retrieving, in response to the count of instance of the facility historical performance data being lower than a predetermined threshold, analogous historical data from within the predetermined time period and that is for an analogous facility element.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:
    a first facility element having a sensor associated therewith and configured to generate first performance data associated with a system of a facility and second performance data associated with the system of the facility; and
    a monitoring and control element in signal communication with the first facility element, wherein the monitoring and control element is configured to:
        receive, from the sensor, second performance data associated with the system of the facility, wherein the second performance data is data that is read by the sensor before the first performance data;
        store the second performance data in a data storage;
        identify one or more analogous facility elements for the first facility element, wherein the one or more analogous facility elements are facility elements associated with third previous performance data indicative of future performance of the first facility element;
        receive the first performance data for the first facility element after storing the second performance data;
        generate projected performance data for the first facility element according to the second performance data associated with the first facility element and the one or more analogous facility elements;
        compare the projected performance data to a performance threshold;
        determine a user setting provided by a user for usability of the facility;
        generate, according to the user setting, and further according to a relationship of the projected performance data to the performance threshold, one or more first operational adjustment commands;
        send the one or more first operational adjustment commands to the first facility element, the one or more first operational adjustment commands causing the first facility element to change operation of the first facility element by overriding; at least one of a setting or operating parameter of the first facility element
        generate one or more second operational adjustment commands according to the user setting, further according to a relationship of the projected performance data to the performance threshold, and further according to the one or more first operational adjustment commands; and
        send the one or more second operational adjustment commands to at least one second facility element, the one or more second operational adjustment commands causing the second facility element to change operation of the second facility element by overriding at least one of a setting or operating parameter of the second facility element.

2. The system of claim 1, wherein the monitoring and control element being configured to identify the one or more analogous facility elements comprises the monitoring and control element being configured to identify the one or more analogous facility elements according to a correlation between at least one of historical performances, in related environments, of the first facility element and the one or more analogous facility elements, one or more physical characteristics of the first facility element and the one or more analogous facility elements, or operational characteristics of the first facility element and the one or more analogous facility elements, wherein the related environments comprises environmental conditions that fall within a predetermined range.

3. The system of claim 2, wherein the monitoring and control element is configured to identify the one or more analogous facility elements as a facility element that is selected from one or more facility elements being monitored by a digital operations center (DOC) and that is selected from the one or more facility elements as the facility element having a performance that most closely matches the performance of the first facility element for a performance parameter range.

4. The system of claim 1, wherein the monitoring and control element being configured to generate the projected performance data comprises the monitoring and control element being configured to generate the projected performance data for the first facility element according to the second performance data associated with the first facility element and the one or more analogous facility elements and further according to external data associated with operating parameters of the first facility element, wherein the external data is data retrieved from outside of the system.

5. The system of claim 4, wherein the first facility element is a part of an environmental control apparatus, wherein the second performance data associated with the first facility element is power usage data associated with the first facility element, wherein the external data includes a weather forecast including a forecast external temperature for an environment associated with the first facility element, and wherein the first performance data comprises data associated with power usage of the first facility element;
wherein the monitoring and control element being configured to receive the first performance data comprises the monitoring and control element being configured to receive the first performance data and associated data comprising at least an external temperature for the environment associated with the first facility element; and
wherein the monitoring and control element is further configured to retrieve the second performance data according to the first performance data, the associated data, and the external data.

6. The system of claim 5, wherein the performance threshold is a demand rate level.

7. An apparatus comprising:
one or more processors; and
a non-transitory computer-readable storage medium storing a program to be executed by the one or more processors for management of a smart facility, the program including instructions for:
receiving first performance data for a facility element of a facility;
receiving second performance data associated the facility element, wherein the second performance data is data that is read before the first performance data;
storing the second performance data in a data storage;
generating projected performance data for the facility element according to the second performance data associated with the facility element;
determining to perform operational adjustment of the facility element in response to the projected performance data being projected to exceed a performance threshold; and
performing, in response to in response to determining to perform the operational adjustment of the facility element:
determining a user setting provided by a user for usability of the facility;
determining, according to the user setting, and further according to a relationship of the projected performance data to the performance threshold, one or more first operational adjustment commands; and
sending, to a system controlling operation of the facility element, the one or more first operational adjustment commands, the one or more first operational adjustment commands causing the facility element to change operation of the facility element by overriding at least one of a setting or operating parameter of the facility element.

8. The apparatus of claim 7, wherein the first performance data comprises data associated with power usage of the facility element; and
wherein the instructions for determining determining to perform operational adjustment of the facility element comprise instructions for determining that operational adjustment of the facility element is needed in response to the projected performance data indicating that power usage of the facility element is projected to exceed a demand rate level.

9. The apparatus of claim 7, wherein the instructions for generating the projected performance data for the facility element include instructions for generating the projected performance data for the facility element according to the second performance data associated with the facility element and further according to external data associated with operating parameters of the facility element, wherein the external data is data retrieved from outside of the smart facility.

10. The apparatus of claim 9, wherein the external data includes a weather forecast including a forecast external temperature for an environment associated with the facility element.

11. The apparatus of claim 10, wherein the facility element is a part of an environmental control apparatus, and wherein the second performance data associated with the facility element is power usage data associated with the facility element.

12. The apparatus of claim 11, wherein the first performance data comprises data associated with power usage of the facility element, wherein the instructions for receiving the first performance data comprise instructions for receiving the first performance data and for receiving associated data comprising at least an external temperature for the environment associated with the facility element; and
wherein the program further includes instructions to retrieve the second performance data according to the first performance data, the associated data, and the external data.

13. The apparatus of claim 12, wherein the instructions to retrieve the second performance data include instructions to retrieve facility historical performance data that is from within a predetermined time period and that is for the facility element.

14. The apparatus of claim 13, wherein the instructions to retrieve the second performance data further include instructions to:
determine a count of instances of the facility historical performance data from within the predetermined time period and that is for the facility element; and retrieve, in response to the count of instance of the facility historical performance data being lower than a predetermined threshold, historical data from within the predetermined time period and that is for an analogous facility element, wherein the analogous facility element is a facility element associated with third previous performance data indicative of future performance of the facility element.

15. A method comprising:

receiving first performance data for a facility element of a facility;

receiving second performance data associated with the facility element, wherein the second performance data is data that is read before the first performance data;

storing the second performance data in a data storage;

generating projected performance data for the facility element according to the second performance data;

determining to perform operational adjustment of the facility element in response to the projected performance data being projected to exceed a performance threshold; and performing, in response to in response to determining to perform the operational adjustment of the facility element:

determine a user setting provided by a user for usability of the facility;

determining, according to the user setting, and further according to a relationship of the projected performance data to the performance threshold, one or more operational adjustment commands; and sending, to a system controlling operation of the facility element, the one or more operational adjustment commands, the one or more operational adjustment commands causing the facility element to change operation of the facility element by overriding at least one of a setting or operating parameter of the facility element.

16. The method of claim 15, wherein the generating projected performance data for the facility element comprises generating the projected performance data for the facility element according to the second performance data associated with the facility element and further according to external data associated with operating parameters of the facility element, wherein the external data is data retrieved from outside of the facility.

17. The method of claim 16, wherein the first performance data comprises data associated with power usage of the facility element, wherein the external data includes a weather forecast including a forecast external temperature for an environment associated with the facility element, wherein the facility element is a part of an environmental control apparatus, and wherein the second performance data associated with the facility element is historical power usage data associated with the facility element.

18. The method of claim 17, wherein the receiving the first performance data comprises receiving the first performance data and receiving associated data comprising at least an external temperature for the environment associated with the facility element; and wherein the receiving the second performance data includes retrieving the second performance data according to the first performance data, the associated data, and the external data.

19. The method of claim 18, wherein the retrieving the second performance data comprises retrieving facility historical performance data that is from within a predetermined time period and that is for the facility element.

20. The method of claim 19, wherein the retrieving the second performance data comprises:

determining a count of instances of the facility historical performance data from within the predetermined time period and that is for the facility element; and retrieving, in response to the count of instance of the facility historical performance data being lower than a predetermined threshold, analogous historical data from within the predetermined time period and that is for an analogous facility element, wherein the analogous facility element is a facility element associated with third previous performance data indicative of future performance of the facility element.

\* \* \* \* \*